United States Patent
Yeh

(10) Patent No.: US 9,009,442 B2
(45) Date of Patent: Apr. 14, 2015

(54) DATA WRITING METHOD, MEMORY CONTROLLER AND MEMORY STORAGE APPARATUS

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 798 days.

(21) Appl. No.: 13/311,572

(22) Filed: Dec. 6, 2011

(65) Prior Publication Data

US 2013/0054877 A1 Feb. 28, 2013

(30) Foreign Application Priority Data

Aug. 22, 2011 (TW) .............................. 100129972 A

(51) Int. Cl.
G06F 13/00 (2006.01)
G06F 12/02 (2006.01)

(52) U.S. Cl.
CPC .................................. *G06F 12/0246* (2013.01)

(58) Field of Classification Search
None
See application file for complete search history.

(56) References Cited

U.S. PATENT DOCUMENTS

| 2008/0120488 | A1* | 5/2008 | Woo et al. ...................... 711/209 |
| 2010/0169544 | A1* | 7/2010 | Eom et al. ...................... 711/103 |
| 2010/0185806 | A1* | 7/2010 | Pruthi et al. ................... 711/103 |
| 2012/0117351 | A1* | 5/2012 | Motwani et al. .............. 711/165 |

FOREIGN PATENT DOCUMENTS

TW 201122810 7/2011

* cited by examiner

*Primary Examiner* — Sean D Rossiter
(74) *Attorney, Agent, or Firm* — Jianq Chyun IP Office

(57) ABSTRACT

A data writing method and a memory controller and a memory storage apparatus using the same are provided. The method includes selecting physical units as a global random area and building a global random searching table for recording update information corresponding to updated logical pages that data stored in the global random area belongs to. The method also includes receiving updated data belonging to a logical page of a logical unit, assigning an index number for the logical unit, writing the updated data into the global random area, and using the index number to record update information corresponding the logical page in the global random searching table. Accordingly, a global random searching table having smaller size can be used for recording update information corresponding to updated logical pages that data stored in the global random area belongs to.

20 Claims, 22 Drawing Sheets

| index number | logical unit |
|---|---|
| 0 | 710(0) |
| 1 | N/A |
| ⋮ | ⋮ |
| 127 | N/A |

DATA WRITING METHOD, MEMORY CONTROLLER AND MEMORY STORAGE APPARATUS

CROSS-REFERENCE TO RELATED APPLICATION

This application claims the priority benefit of Taiwan application serial no. 100129972, filed on Aug. 22, 2011. The entirety of the above-mentioned patent application is hereby incorporated by reference herein and made a part of this specification.

BACKGROUND

1. Technology Field

The present invention relates to a data writing method for a rewritable non-volatile memory module, and a memory controller and a memory storage apparatus using the method.

2. Description of Related Art

Digital cameras, cells phones, and digital music players have undergone rapid growth in recent years, so that consumer demand for storage media have also rapid increased. Since a rewritable non-volatile memory has the characteristics of non-volatility of data, low power consumption, small volume, non-mechanical structure, and fast reading and writing speed, the rewritable non-volatile memory is the most adaptable memory to be applied in a portable electronic product, such as a notebook computer. A solid state drive is a storage apparatus adopting flash memory as storage medium. Therefore, the flash memory industry has become a very important part of the electronic industry in recent years.

A flash memory module has a plurality of physical blocks, and each of the physical blocks has a plurality of physical pages, wherein data must be written into a physical block according to the sequence of the physical pages in the physical block. In addition, a physical page containing data has to be erased before it is used for writing new data. Particularly, each physical block is the smallest erasing unit, and each physical page is the smallest programming (i.e., writing) unit. Therefore, in the management of the flash memory module, the physical blocks are grouped into a data area and a spare area.

The physical blocks of the data area are used for storing data stored by the host system. To be more specific, a memory management circuit in a memory storage apparatus converts a logical access address accessed by the host system into a logical page of a logical block and maps the logical page of the logical block to a physical page of a physical block in the data area. Namely, in the management of a flash memory module, the physical blocks in the data area are deemed used physical blocks (for instance, the physical blocks already containing data written by a host system). For example, the memory management circuit records the mapping relationship between the logical blocks and the physical blocks in the data area in a logical block-physical block mapping table, wherein the logical pages of each logical block are sequentially mapped to the physical pages of the corresponding physical block.

Physical blocks in the spare area are used for substituting the physical blocks in the data area. In particular, a physical block already containing data has to be erased before it is used for writing new data, while a physical block in the spare area is used for writing updated data in replacement of the physical block originally mapped to a logical block. Hence, the physical blocks in the spare area are either blank blocks or usable blocks (i.e., these blocks do not contain data, or these blocks contain data marked as invalid data).

Namely, the physical pages of the physical blocks in the data area and the spare area alternately map the logical pages of the logical blocks for storing data written by the host system. For example, the memory manage circuit of the memory storage apparatus selects at least a physical block from the spare area as a global random physical block, and when the logical access address, that the updated data to be written by the host system belongs to, corresponds to a logical page of a logical unit in the storage apparatus, the memory management circuit in the storage apparatus writes the updated data into the physical pages of the global random physical blocks.

Moreover, when the updated data is written into the global random physical blocks, the memory management circuit may record updated information about the updated logical page in the global random area searching table. Namely, the global random area searching table records information about the physical pages of the global random physical blocks, which are used for writing the updated data of the updated logical pages. Here, a record for storing updated information of an updated logical page in the global random area searching table is called an entry. Every entry includes the field for recording the address of the updated logical page, the field for recording the address of the physical page storing the data belonging to the updated logical page in the global random physical blocks and the field for marking whether the entry is valid or not. Because data belonging to all logical pages may be temporarily stored in the global random area, the field for recording the address of the updated logical page in the global random area searching table must include more bits, so as to store enough information for identifying all the addresses of the logical pages.

During the operation of the memory storage apparatus, the global random area searching table must be loaded into the buffer memory for accessing. However, for the memory storage apparatus equipped with the buffer memory having small storage capacity, the said global random area searching table can not be loaded into the buffer memory. Therefore, developing a data writing method, which can using the global random physical block to store data in a memory storage apparatus equipped with the buffer memory having small storage capacity, is needed.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention provides a data writing method, a memory controller and a memory storage apparatus, which can use the global random physical block for storing data with a buffer memory having limited capacity.

According to an exemplary embodiment of the present invention, a data writing method for a rewritable non-volatile memory module is provided, wherein the rewritable non-volatile memory module includes a plurality of physical blocks, each of the physical blocks includes a plurality of physical pages, the physical blocks are grouped into at least a data area and a spare area, the physical blocks belonging to the data area and the spare area are grouped into a plurality of physical units, the physical units of the spare area are used for substituting the physical units of the data area to write data, a plurality of logical units are configured for mapping the physical units of the data area, and each of the logical units includes a plurality of logical pages. The data writing method includes selecting at least one physical unit from the physical units of the spare area as a global random area, wherein the global random area is used for temporarily storing data belonging to a plurality of updated logical pages, and the updated logical pages belong to a plurality of updated logical units among the logical units. The data writing method further includes building a global random area searching table to record updated information corresponding to the updated logical pages in the global random area. The data writing method further includes receiving a write command and updated data corresponding to the write command, wherein the updated data belongs to a first logical page and the first logical page belongs to the first logical unit. The data writing method also includes determining whether the global random area stores data belonging to the first logical unit; and when the global random area does not store data belonging to the first logical unit, determining whether the number of the updated logical units is smaller than a predetermined number, wherein the predetermined number is smaller than the total number of the logical units. The data writing method further includes when the number of the updated logical units is smaller than the predetermined number, setting a first index number for the first logical unit, and writing the updated data into the global random area and using the first index number corresponding to the first logical unit to record updated information corresponding to the first logical page in the global random searching table.

According to an exemplary embodiment of the present invention, a data writing method for a rewritable non-volatile memory module is provided, wherein the rewritable non-volatile memory module includes a plurality of physical blocks, each of the physical blocks includes a plurality of physical pages, the physical blocks are grouped into at least a data area and a spare area, the physical blocks belonging to the data area and the spare area are grouped into a plurality of physical units, the physical units of the spare area are used for substituting the physical units of the data area to write data, a plurality of logical units are configured for mapping to the physical units of the data area, and each of the logical units includes a plurality of logical pages. The data writing method includes selecting at least one physical unit from the physical units of the spare area as a first global random area, and selecting at least one physical unit from the physical units of the spare area as a second global random area, wherein the first global random area is used for temporarily storing data belonging to a plurality of first updated logical pages, the second global random area is used for temporarily storing data belonging to a plurality of second updated logical pages, the first updated logical pages belong to a plurality of first updated logical units, and the second updated logical pages belong to a plurality of second updated logical units. The data writing method also includes building a first global random area searching table for recording updated information corresponding to the first updated logical pages in the first global random area, and building a second global random area searching table for recording updated information corresponding to the second updated logical pages in the second global random area. The data writing method further includes receiving a write command and updated data corresponding to the write command, wherein the updated data belongs to a first logical page and the first logical page belongs to the first logical unit. The data writing method also includes determining whether the first global random area or the second global random area stores data belonging to the first logical unit; and when both the first global random area and the second global random area do not store data belonging to the first logical unit, determining whether the number of the updated logical units is smaller than a predetermined number, wherein the predetermined number is smaller than the total number of the logical units. The data writing method further includes when the number of the first updated logical units is smaller than the predetermined number, setting a first index number for the first logical unit, and writing the updated data into the first global random area and using the first index number corresponding to the first logical unit to record updated information corresponding to the first logical page in the first global random area searching table. Moreover, the data writing method further includes, when the number of the first updated logical units is not smaller than the predetermined number, determining whether the number of the second updated logical units is smaller than the predetermined number. The data writing method further includes when the number of the second updated logical units is smaller than the predetermined number, setting a second index number for the first logical unit, and writing the updated data into the second global random area and using the second index number corresponding to the first logical unit to record updated information corresponding to the first logical page in the second global random area searching table.

According to an exemplary embodiment of the present invention, a memory controller for controlling a rewritable non-volatile memory module is provided, wherein the rewritable non-volatile memory module includes a plurality of physical blocks, and each of the physical blocks includes a plurality of physical pages. The memory controller includes a host interface, a memory interface and a memory management circuit. The host interface is configured to be coupled to a host system. The memory interface is configured to be coupled to rewritable non-volatile memory module. The memory management circuit is coupled to the host interface and the memory interface, and configured to group the physical blocks into at least a data area and a spare area. Moreover, the memory management circuit groups the physical blocks belonging to the data area and the spare area into a plurality of physical units, wherein the physical units of the spare area are used for substituting the physical units of the data area to write data. In addition, the memory management circuit configures a plurality of logical units for mapping to the physical units of the data area, wherein each of the logical units includes a plurality of logical pages. The memory management circuit selects at least one physical unit from the physical units of the spare area as a global random area, wherein the global random area is used for temporarily storing data belonging to a plurality of updated logical pages, and the updated logical pages belong to a plurality of updated logical units among the logical units. The memory management circuit builds a global random area searching table to record updated information corresponding to the updated logical pages in the global random area. The memory management circuit receives a write command and updated data corresponding to the write command, wherein the updated data belongs to a first logical page and the first logical page belongs to a first logical unit among the logical units. The memory management circuit determines whether the global random area stores data belonging to the first logical unit. When the global random area does not store data belonging to the first logical unit, the memory management circuit determines whether the number of the updated logical units is smaller than a predetermined number, wherein the predetermined number is smaller than the total number of the logical units. When the number of the updated logical units is smaller than the predetermined number, the memory management circuit sets a first index number for the first logical unit, and writes the updated data into the global random area and uses the first index number corresponding to the first logical unit to record updated information corresponding to the first logical page in the global random searching table.

According to an exemplary embodiment of the present invention, a memory storage apparatus including a connector, a rewritable non-volatile memory module and a memory controller is provided. The connector is configured to be coupled to the host system. The rewritable non-volatile memory module includes a plurality of physical blocks, and each of the physical blocks has a plurality of physical pages. The memory controller is coupled to the connector and the rewritable non-volatile memory module for grouping the physical blocks into at least a data area and a spare area. Moreover, the memory controller groups the physical blocks belonging to the data area and the spare area into a plurality of physical units, wherein the physical units of the spare area are used for substituting the physical units of the data area to write data. In addition, the memory controller configures a plurality of logical units for mapping to the physical units of the data area, wherein each of the logical units includes a plurality of logical pages. The memory controller selects at least a physical unit from the physical units of the spare area as a global random area, wherein the global random area is used for temporarily storing the data belonging to a plurality of updated logical pages, and the updated logical pages belong to a plurality of updated logical units among the logical units. The memory controller builds a global random area searching table to record updated information corresponding to the updated logical pages in the global random area. The memory controller receives a write command and updated data corresponding to the write command, wherein the updated data belongs to a first logical page and the first logical page belongs to a first logical unit among the logical units. The memory controller determines whether the global random area stores data belonging to the first logical unit. When the global random area does not store data belonging to the first logical unit, the memory controller further determines whether the number of the updated logical units is smaller than a predetermined number, wherein the predetermined number is smaller than the total number of the logical units. When the number of the updated logical units is smaller than the predetermined number, the memory controller sets a first index number for the first logical unit, and writes the updated data into the global random area and uses the first index number corresponding to the first logical unit to record updated information corresponding to the first logical page in the global random searching table.

According to an exemplary embodiment of the present invention, a data writing method for a rewritable non-volatile memory module is provided, wherein the rewritable non-volatile memory module includes a plurality of physical blocks, each of the physical blocks includes a plurality of physical pages, the physical blocks are grouped into at least a data area and a spare area, the physical blocks belonging to the data area and the spare area are grouped into a plurality of physical units, the physical units of the spare area are used for substituting the physical units of the data area to write data, a plurality of logical units are set for mapping the physical units of the data area, and each of the logical units includes a plurality of logical pages. The data writing method includes selecting at least one physical unit from the physical units of the spare area as a global random area, wherein the global random area is used for temporarily storing data belonging to a plurality of updated logical pages, and the updated logical pages belong to a plurality of updated logical units among the logical units. The data writing method further includes receiving a write command and updated data corresponding to the write command, wherein the updated data belongs to a first logical page and the first logical page belongs to the first logical unit. The data writing method further includes determining whether the global random area stores data belong to the first logical unit. The data writing method also includes when the global random area stores data belonging to the first logical unit, writing the updated data into the global random area, and when the global random area does not store data belonging to the first logical unit, determining whether the number of the updated logical units is smaller than a predetermined number, wherein the predetermined number is smaller than the total number of the logical units. The data writing method further includes when the number of the updated logical units is smaller than the predetermined number, writing the updated data into the global random area, and when the number of the updated logical units is not smaller than the predetermined number, selecting a first physical unit from the physical units of the spare area as a child physical unit corresponding to the first logical unit and writing the updated data into the child physical unit corresponding to the first logical unit, wherein the child physical unit is only used for storing data corresponding to the first logical unit.

According to an exemplary embodiment of the present invention, a memory storage apparatus including a connector, a rewritable non-volatile memory module and a memory controller is provided. The connector is configured to be coupled to the host system. The rewritable non-volatile memory module includes a plurality of physical blocks, and each of the physical blocks includes a plurality of physical pages. The memory controller is coupled to the connector and the rewritable non-volatile memory module for grouping the physical blocks into at least a data area and a spare area. Moreover, the memory controller groups the physical blocks belonging to the data area and the spare area into a plurality of physical units, wherein the physical units of the spare area are used for substituting the physical units of the data area to write data. In addition, the memory controller configures a plurality of logical units to map the physical units of the data area, wherein each of the logical units includes a plurality of logical pages. The memory controller selects at least one physical unit from the physical units of the spare area as a global random area, wherein the global random area is used for temporarily storing the data belonging to a plurality of updated logical pages, and the updated logical pages belong to a plurality of updated logical units among the logical units. Furthermore, the memory controller receives a write command and updated data corresponding to the write command, wherein the updated data belongs to a first logical page and the first logical page belongs to a first logical unit of the logical units. The memory controller determines whether the global random area stores data belonging to the first logical unit. When the global random area does not store data belonging to the first logical unit, the memory controller further determines whether the number of the updated logical units is smaller than a predetermined number, wherein the predetermined number is smaller than the total number of the logical units. When the number of the updated logical units is smaller than the predetermined number, the memory controller writes the updated data into the global random area. In addition, when the global random area stores data belonging to the first logical unit, the memory controller writes the updated data into the global random area. When the number of the updated logical units is not smaller than the predetermined number, the memory controller selects a first physical unit from the physical units of the spare area as a child physical unit corresponding to the first logical unit and writes the updated data into the child physical unit corresponding to the first logic unit, wherein the child physical unit is only used for storing data belonging to the first logical unit.

Based on the above, in the data writing method, the memory controller and the memory storage apparatus of the exemplarily embodiment, the global random area only can store the updated data belonging to the predetermined number of the logical units. Therefore, the entry configured to record the updated information corresponding to the updated logical pages in the global random area searching table can be effectively reduced, and thus the global random area searching table so can be successfully loaded into the buffer memory.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

FIG. 8 illustrates an example of an index number mapping table according to the first exemplary embodiment of the present invention.

DESCRIPTION OF THE EMBODIMENTS

Figure 1A:
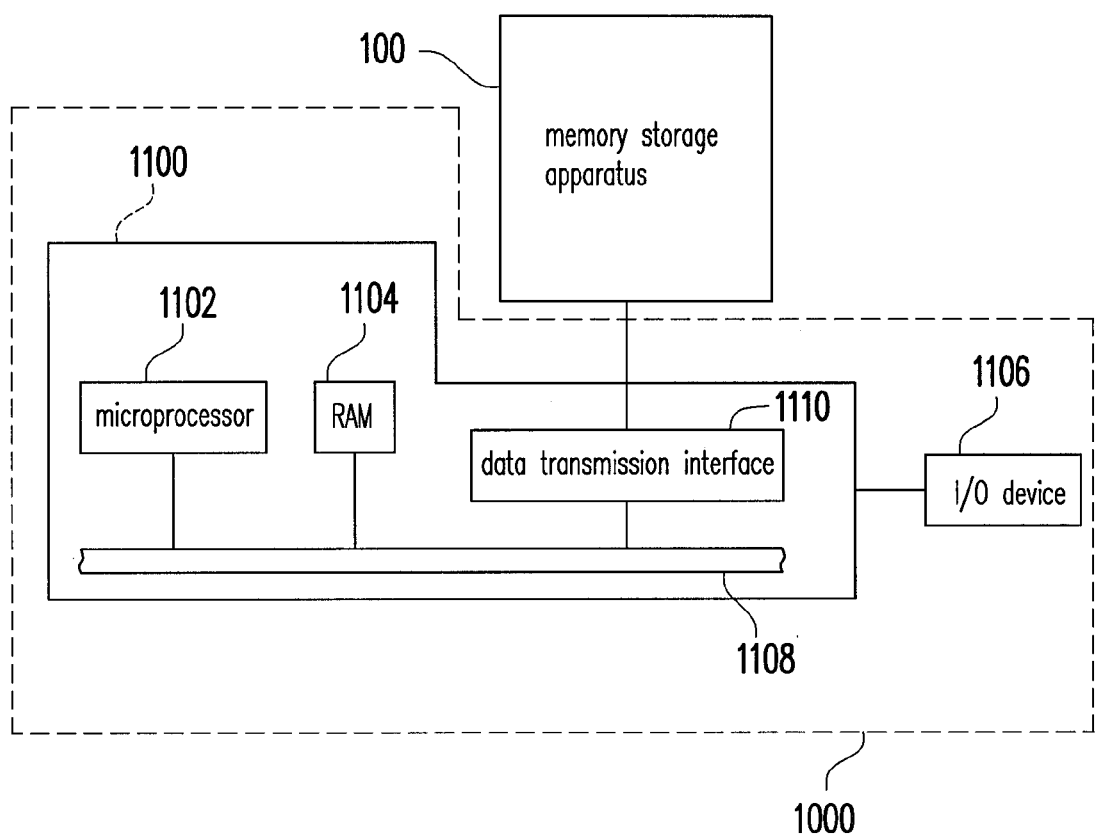
FIG. 1A illustrates a host system and a memory storage apparatus according to a first exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

A memory storage apparatus (i.e., a memory storage system), typically, includes a rewritable non-volatile memory module and a controller (i.e., a control circuit). The memory storage apparatus is usually used together with a host system, such that the host system can write data into or read data from the memory storage apparatus.

FIG. 1A illustrates a host system and a memory storage apparatus according to a first exemplary embodiment of the invention.

Figure 1B:
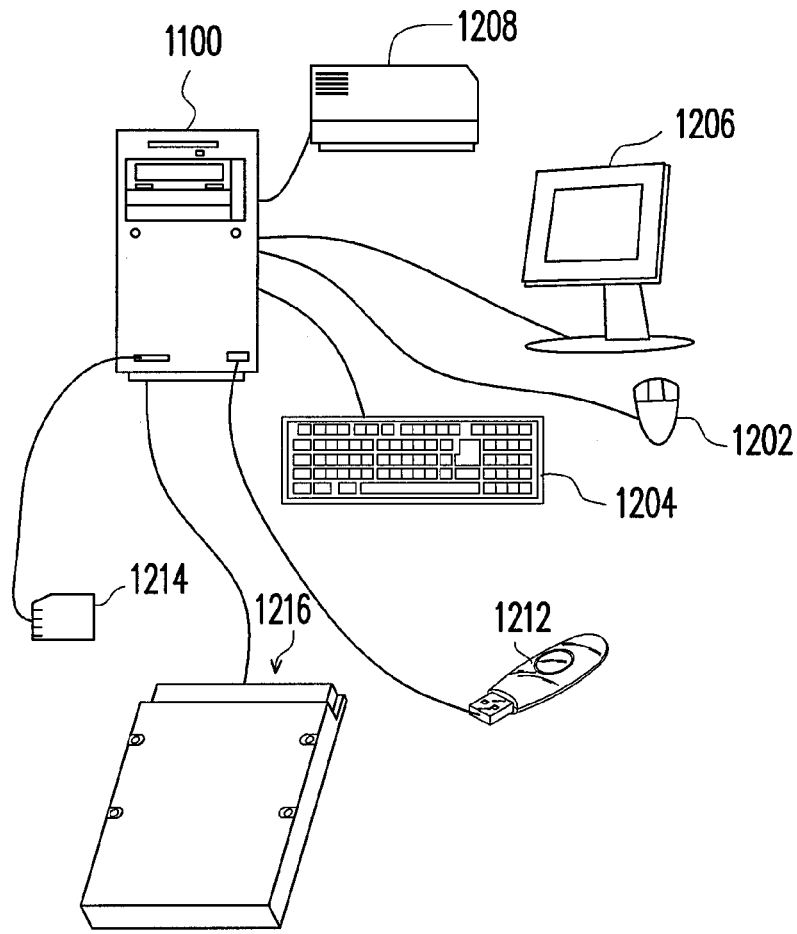
FIG. 1B illustrates a computer, an input/output (I/O) device, and a storage apparatus according to the exemplary embodiment of the present invention.

With reference to FIG. 1A, a host system 1000 in most cases includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208 as shown in FIG. 1B. Note that the devices depicted in FIG. 1B should not be construed as limitations to the invention, and the I/O device 1106 may include other devices.

In the exemplary embodiment of the present invention, the memory storage apparatus 100 is coupled to the devices of the host system 1000 through the data transmission interface 1110. By using the microprocessor 1102, the RAM 1104, and the I/O device 1106, the data can be written into or read from the memory storage apparatus 100. For instance, the memory storage apparatus 100 may be a non-volatile memory storage apparatus, such as a flash drive 1212, a memory card 1214, or a solid state drive (SSD) 1216 as shown in FIG. 1B.

Figure 1C:
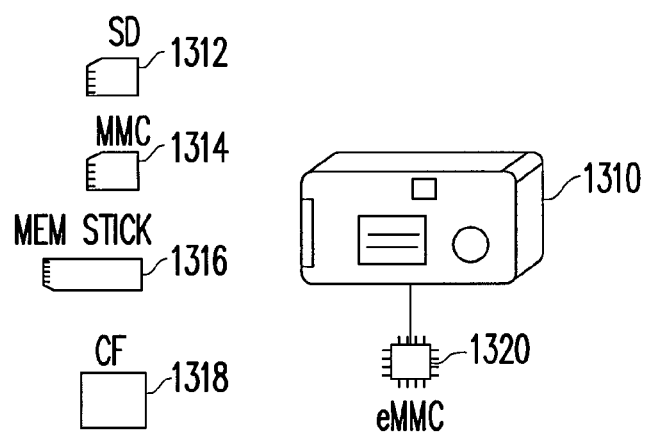
FIG. 1C illustrates a host system and a memory storage apparatus according to the exemplary embodiment of the present invention.

Generally, the host system 1000 can substantially be any system used together with the memory storage apparatus 100 for storing data. Even though the host system 1000 is described as a computer system in the present exemplary embodiment, the host system 1000 in another exemplary embodiment may be a digital camera, a video camera, a communication device, an audio player, a video player, and so forth. For instance, if the host system is a digital camera (video camera) 1310, the rewritable non-volatile memory storage apparatus is an SD card 1312, an MMC card 1314, a memory stick 1316, a CF card 1318n or an embedded storage apparatus 1320 (as shown in FIG. 1C). The embedded storage device 1320 includes an embedded MMC (eMMC). It should be noted that the eMMC is directly coupled to the substrate of the host system.

Figure 2:
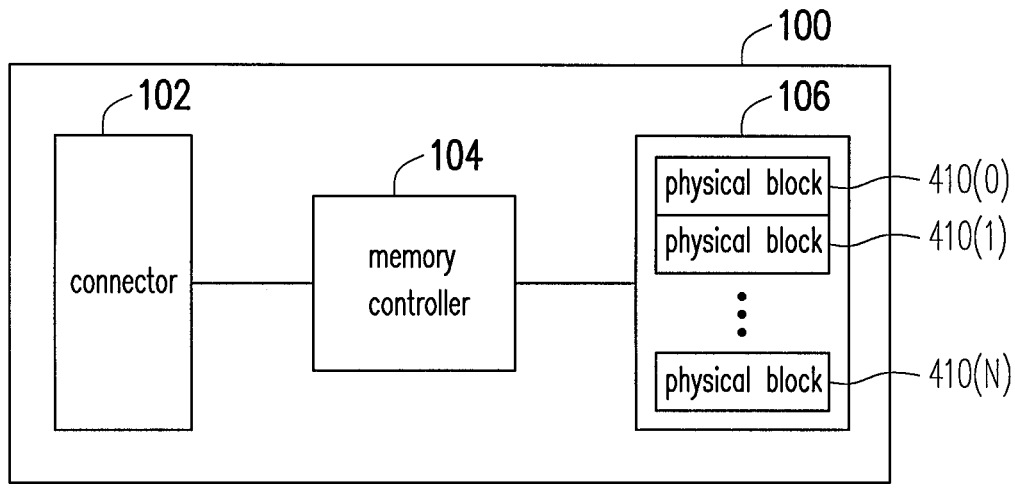
FIG. 2 is a schematic block diagram illustrating the memory storage apparatus depicted in FIG. 1A.

FIG. 2 is a schematic block diagram illustrating the memory storage apparatus depicted in FIG. 1A.

Referring to FIG. 2, the memory storage apparatus 100 includes a connector 102, a memory controller 104, and a rewritable non-volatile memory module 106.

In the present exemplary embodiment, the connector 102 complies with the serial advanced technology attachment (SATA) standard. However, the present invention is not limited thereto, and the connector 102 may comply with the parallel advanced technology attachment (PATA) standard, the Institute of Electrical and Electronic Engineers (IEEE) 1394 standard, the peripheral component interconnect (PCI) express standard, the universal serial bus (USB) standard, the secure digital (SD) standard, the memory sick (MS) standard, the multi media card (MMC) standard, the compact flash (CF) standard, the integrated device electronics (IDE) standard, or other suitable standards.

The memory controller 104 is configured to execute a plurality of logical gates or control instructions implemented in a hardware form or a firmware form and performs various data operations such as data writing, reading, and erasing in the rewritable non-volatile memory module 106 according to commands from the host system 1000.

The rewritable non-volatile memory module 106 is coupled to the memory controller 104 and configured to temporarily store data written by the host system 1000.

The rewritable non-volatile memory module 106 includes a plurality of physical blocks 410(O)-410(N). For instance, the physical blocks 410(O)-410(N) may belong to the same memory die or different memory dies. Each of the physical blocks includes a plurality of physical pages, and each of the physical pages includes at least a physical sector, wherein the physical pages belonging to the same physical block may be written independently and must be erased simultaneously. For instance, each of the physical blocks is composed of 128 physical pages, and each of the physical pages includes 8 physical sectors. Namely, in the example which each of the physical sectors is 512 bytes, the capacity of each physical page is 4 Kilobytes. However, the present invention is not limited thereto, and each of the physical blocks may also be comprised of 64, 256, or any other number of physical pages.

In detail, a physical block is the smallest unit for erasing data. Namely, each of the physical blocks contains the least number of memory cells that are erased all together. Each of physical pages is the smallest unit for programming data. Namely, each of the physical pages is the smallest unit for writing data. However, it is noted that, in another exemplary embodiment of the invention, a physical sector or any other can also be the smallest unit for writing data. Each physical page usually includes a data bit area and a redundant bit area. The data bit area is configured to store user data, and the redundant bit area is configured to store system data (e.g., error checking and correcting (ECC) codes).

In the present embodiment, the rewritable non-volatile memory module 106 is a multi level cell (MLC) NAND flash memory module. However, the present invention is not limited thereto, and the rewritable non-volatile memory module 106 may also be a single level cell (SLC) NAND flash memory module, other flash memory module or other memory module with the same characteristic.

Figure 3:
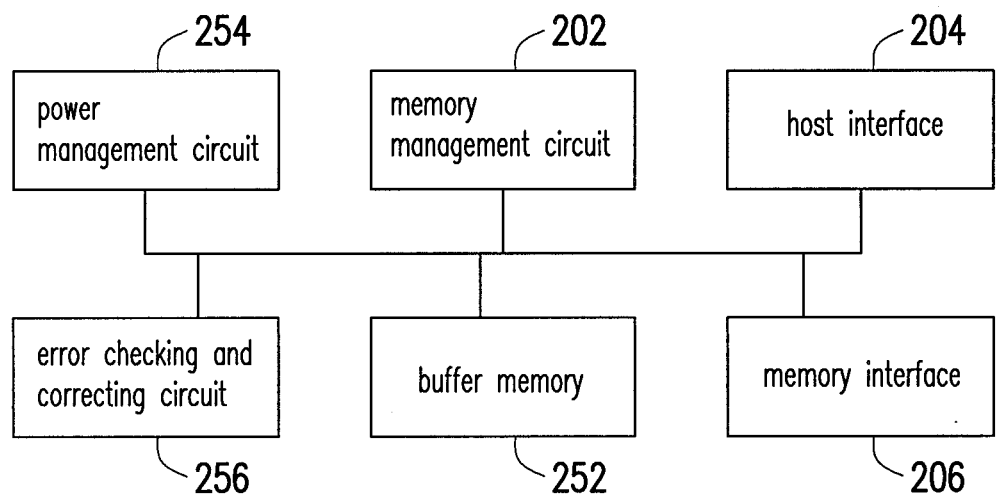
FIG. 3 is a schematic block diagram illustrating a memory controller according to the first exemplary embodiment of the present invention.

FIG. 3 is a schematic block diagram illustrating a memory controller according to the first exemplary embodiment of the present invention.

Referring to FIG. 3, the memory controller 104 includes a memory management circuit 202, a host interface 204 and a memory interface 206.

The memory management circuit 202 is configured for controlling the overall operation of the memory controller 104. In detail, the memory management circuit 202 includes a plurality of control instructions, and the control instructions are executed to write, read, and erase data when the memory storage apparatus 100 is enabled.

In the present exemplary embodiment, the control instructions of the memory management circuit 202 are implemented in a firmware form. For instance, the memory management circuit 202 includes a micro-processor unit (not shown) and a read-only memory (not shown), and these control commands are burned into the read-only memory. When the memory storage apparatus 100 is enabled, the control instructions are executed by the micro-processor unit to write, read, and erase data.

In another exemplary embodiment of the invention, the control instructions of the memory management circuit 202 are stored in a specific area (for instance, the system area of the memory module exclusively used for storing system data) of the rewritable non-volatile memory module 106 as program codes. Additionally, the memory management circuit 202 may have a micro-processor unit (not shown), a read-only memory (not shown), and a RAM (not shown). Particularly, the read-only memory has a boot code, and when the memory controller 104 is enabled, the micro-processor unit executes the boot code to load the control instructions of the memory management circuit 202 stored in the rewritable non-volatile memory module 106 into the RAM of the memory management circuit 202. The micro-processor unit then executes the control instructions to write, read, and erase data. Additionally, the control instructions of the memory management circuit 202 may also be implemented in a hardware form according to another exemplary embodiment.

The host interface 204 is coupled to the memory management circuit 202 and configured for receiving and identifying commands and data transmitted by the host system 1000. Namely, the commands and data from the host system 1000 are transmitted to the memory management circuit 202 through the host interface 204. In the present exemplary embodiment, the host interface 204 complies with the SATA standard. However, the present invention is not limited thereto, and the host interface 204 may also comply with the PATA standard, the IEEE 1394 standard, the PCI Express standard, the USB standard, the SD standard, the MS standard, the MMC standard, the CF standard, the IDE standard, or any other data transmission standard.

The rewritable non-volatile memory interface 206 is coupled to the memory management circuit 202 and configured for accessing the rewritable non-volatile memory module 106. Namely, data to be written into the rewritable non-volatile memory module 106 is converted by the memory interface 206 into a format acceptable to the rewritable non-volatile memory module 106.

In an exemplary embodiment of the present invention, the memory controller 104 further includes a buffer memory 252, a power management circuit 254 and an error checking and correcting circuit 256. The buffer memory 252 is coupled to the memory management circuit 202 and configured for temporarily storing data and commands from the host system 1000 or data from the rewritable non-volatile memory module 106.

The power management circuit 254 is coupled to the memory management circuit 202 and configured for controlling the power of the memory storage apparatus 100.

The error checking and correcting circuit 256 is coupled to the memory management circuit 202 and configured for performing an error checking and correcting procedure to ensure data accuracy. To be specific, when the memory management circuit 202 receives a write command from the host system 1000, the error checking and correcting circuit 256 generates an error checking and correcting (ECC) code for data corresponding to the write command, and the memory management circuit 202 writes the data corresponding to the write command and the corresponding ECC code into the rewrite volatile memory module 106. Subsequently, when the memory management circuit 202 reads the data from the rewritable non-volatile memory module 106, the memory management circuit 202 simultaneously reads the corresponding ECC code, and the error checking and correcting circuit 256 executes the ECC procedure for the read data based on the corresponding ECC code.

Figure 4A:
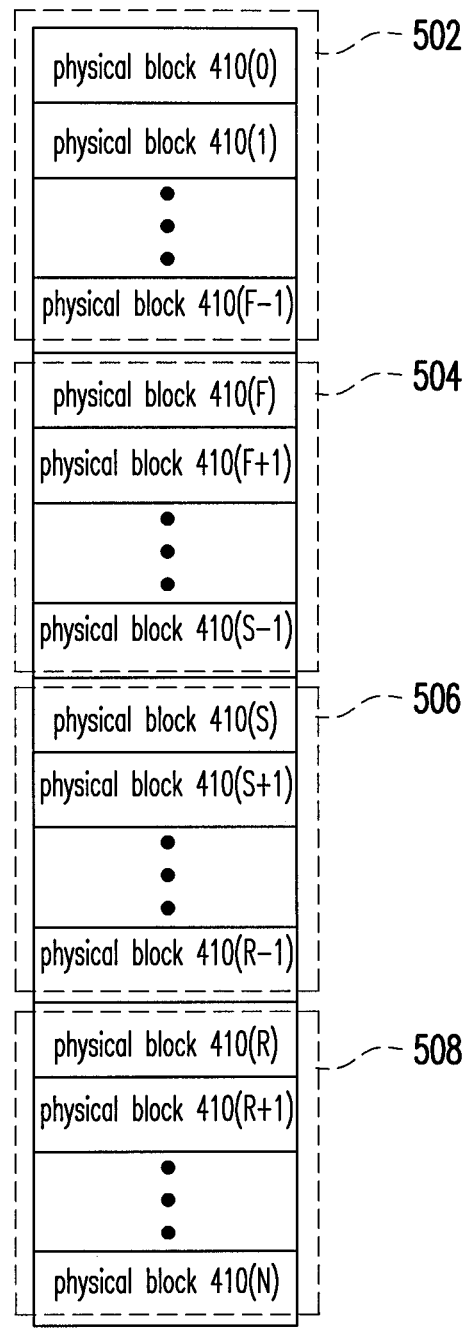
FIGS. 4A and 4B are exemplary diagrams of managing physical blocks according to the first exemplary embodiment of the present invention.
Figure 4B:
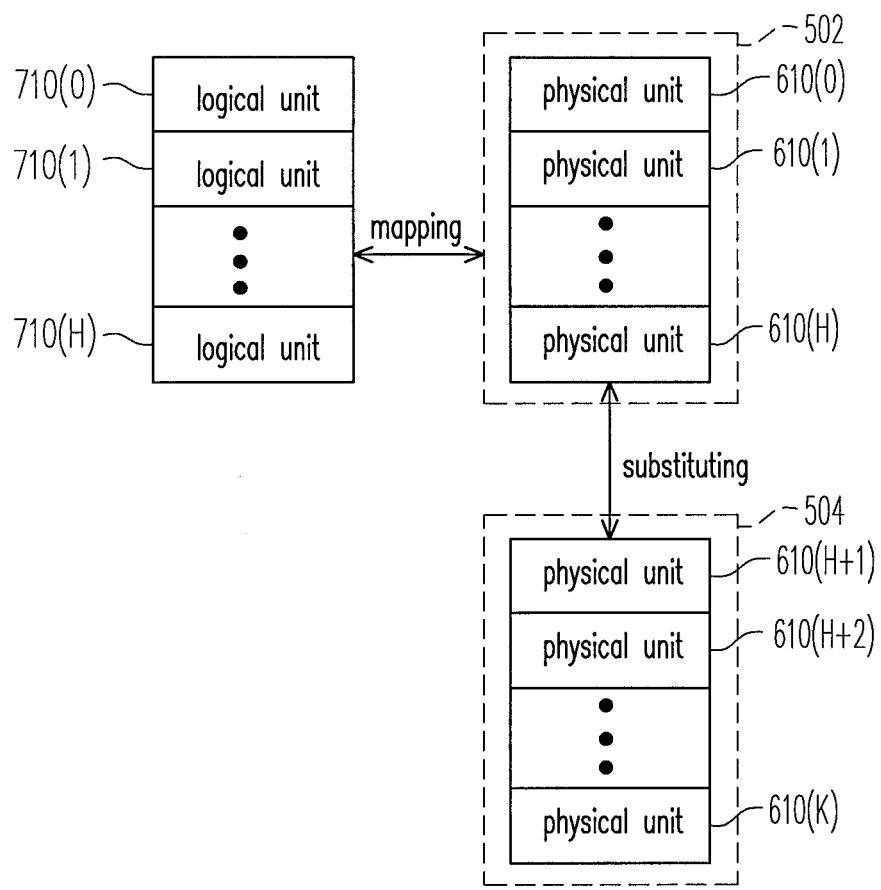

FIG. 4A and FIG. 4B are exemplary diagrams of managing physical blocks according to the first exemplary embodiment of the present invention.

With reference to FIG. 4A, the memory management circuit 202 of the memory controller 104 logically groups the physical blocks 410(0)~410(N) into a data area 502, a spare area 504, a system area 506, and a replacement area 508.

The physical blocks logically belonging to the data area 502 and the spare area 504 are configured for storing data from the host system 1000. To be specific, the physical blocks of the data area 502 are the physical blocks which have been used for storing data, and the physical blocks of the spare area 504 are the physical blocks which are used for substituting the physical blocks of the data area 502. Namely, when a write command and data to be written are received from the host system 1000, the memory management circuit 202 selects a physical block from the spare area 504 and writes the data into the selected physical block for substituting the physical blocks of the data area 502.

The physical blocks logically belonging to the system area 506 are configured for recording system data. For instance, the system data includes the manufacturer and model of the rewritable non-volatile memory module, the number of the physical blocks in the rewritable volatile memory module, the number of the physical pages in each physical block, and so on.

The physical blocks logically belonging to the replacement area 508 are used for a bad block replacement procedure to replace the damaged physical blocks. Particularly, if there are still some normal physical blocks in the replacement area 508, and a physical block in the data area 502 is damaged, the memory management circuit 202 takes a normal physical block from the replacement area 508 to replace the damaged physical block.

Referring to FIG. 4B, the memory management circuit 202 groups the physical blocks 410(0)~410(S−1) of the data area 502 and the spare area 504 into a plurality of physical units 610(0)~610(K), and manages the physical blocks in units of each physical unit. In the exemplary embodiment, each physical unit is composed of one physical block. Nevertheless, it should be understood that the present invention is not limited thereto. In another exemplary embodiment, each physical unit may be constituted by at least two physical blocks in the same sub memory module or in different sub memory modules.

In addition, the memory management circuit 202 configures a plurality of logical units 710(0)~710(H) for mapping the physical units of the data area, wherein each logical units includes a plurality of logical pages for orderly mapping the physical pages corresponding to the physical units. In the present exemplary embodiment, each physical unit is composed of one physical block, and each logical page maps one physical page (e.g. the capacity of each logical page is equal to the capacity of one physical page). However, in the example of each physical unit composed of a plurality of physical blocks, each logical page maps a plurality of physical pages, (e.g. the capacity of each logical page is equal to the capacity of a plurality of physical pages).

In the present exemplary embodiment, the memory management circuit 202 maintains a logical block-physical block mapping table to record the mapping relationship between the logical blocks 710(0)-710(H) and the physical blocks in the data area 502. For instance, when the host system 1000 is about to access a logical access address, the memory management circuit 202 converts the logical access address accessed by the host system 1000 into a multi-dimensional address composed of the corresponding logical block, the corresponding logical page, and the corresponding logical sector, and the memory management circuit 202 accesses data in the corresponding physical page according to the logical block-physical block mapping table.

In the present exemplary embodiment, the memory management circuit 202 selects a physical unit from the spare area 504 as a global random area, and writes the data including the write command from the host system 1000 (also be referred to updated data) into the physical unit of the global random area (also be referred to global random physical units). In the present exemplary embodiment, the global random physical unit is designed for storing data corresponding to different logical units respectively.

Specifically, when the memory storage apparatus 100 receives the write command from the host system 1000, data in the write command from the host system 1000 may be orderly written into the physical unit of the global random area. Also, when the physical unit of the global random area is filled with data, the memory management circuit 202 selects a physical unit from the spare area 504 as another global random physical unit for subsequently writing the updated data corresponding to the write command from the host system 1000. When the number of the physical units of the global random area reaches the upper limit, the memory management circuit 202 performs the data merging operation so that the data stored in the global random physical units becomes invalid data, and then the memory management circuit 202 associates the global random physical units only storing the invalid data with the spare area 504.

FIGS. 5A-5G are the simplified examples of writing data using a global random area.

In order to explain easily, here it is assumed that the data area 502 includes 5 physical units. And, the spare area 504 includes 4 physical units, and each physical unit includes 3 physical pages. Additionally, data to be written in each physical unit must be written according to the order of the physical pages, and the upper limit of the number of the physical units served as the global random physical units is 3.

Referring to 5A, in the initial status of the memory storage apparatus 100, the logical pages of the logical units 710(0)~710(4) may orderly map the physical pages of the physical units 610(0)~610(4) in the data area 502, and the spare area 504 includes the physical units 610(5)~610(8). Namely, the memory management circuit 202 records the mapping relationship between the logical units 710(0)~710(4) and the physical units 610(0)~610(4) in the logical block-physical block mapping table, and considers that the physical pages of the physical units 610(0)~610(4) have stored data belonging to the logical pages of the logical units 710(0)~710(4) (i.e. initial data ID1~ID15). It should be noted that, when the memory storage apparatus 100 is manufactured in the factory, the initial data ID1~ID15 may be null. Furthermore, the memory management circuit 202 records the usable physical units 610(5)~610(8) in the spare area 504.

Figure 5A:
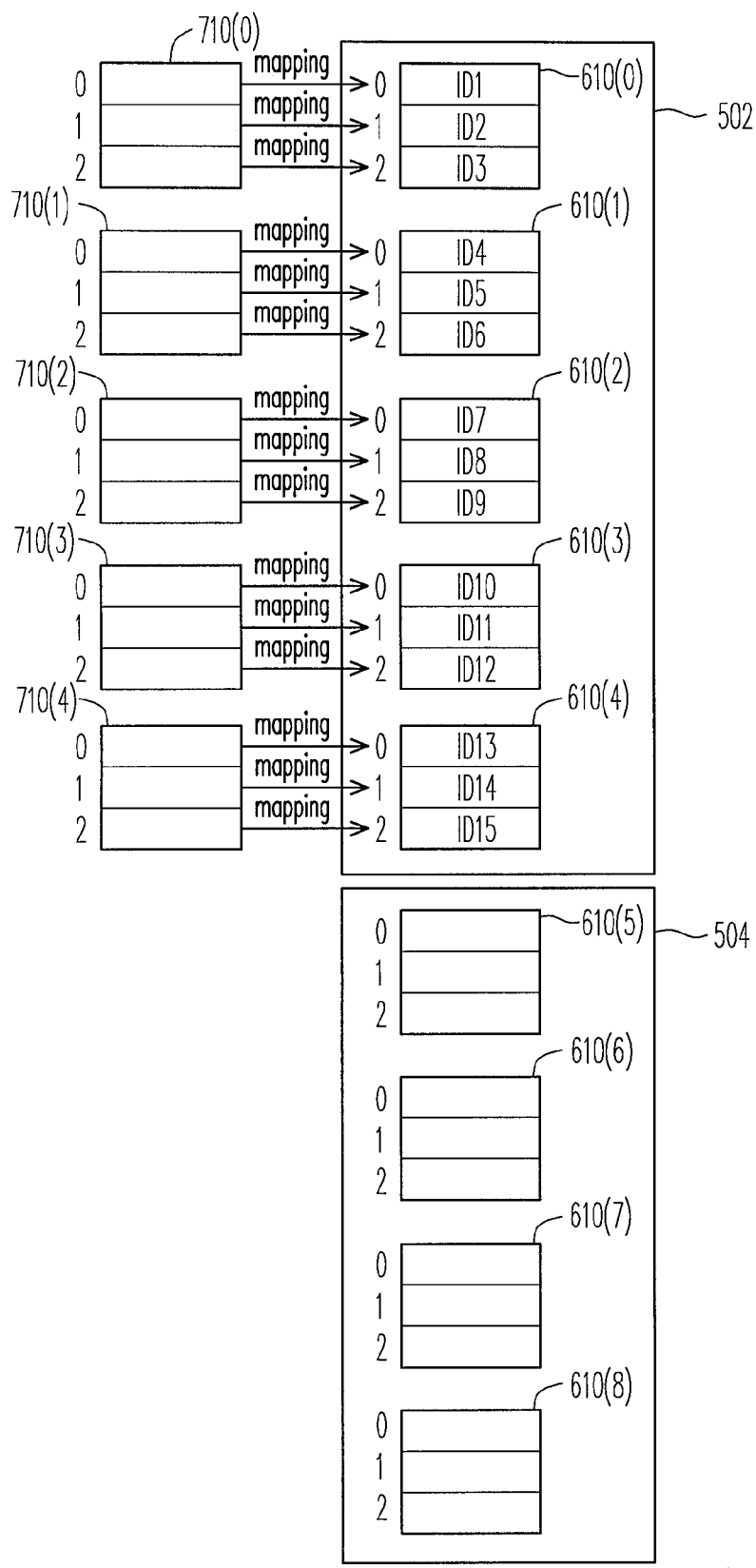
FIGS. 5A-5G are the simplified examples of writing data using a global random area.
Figure 5B:
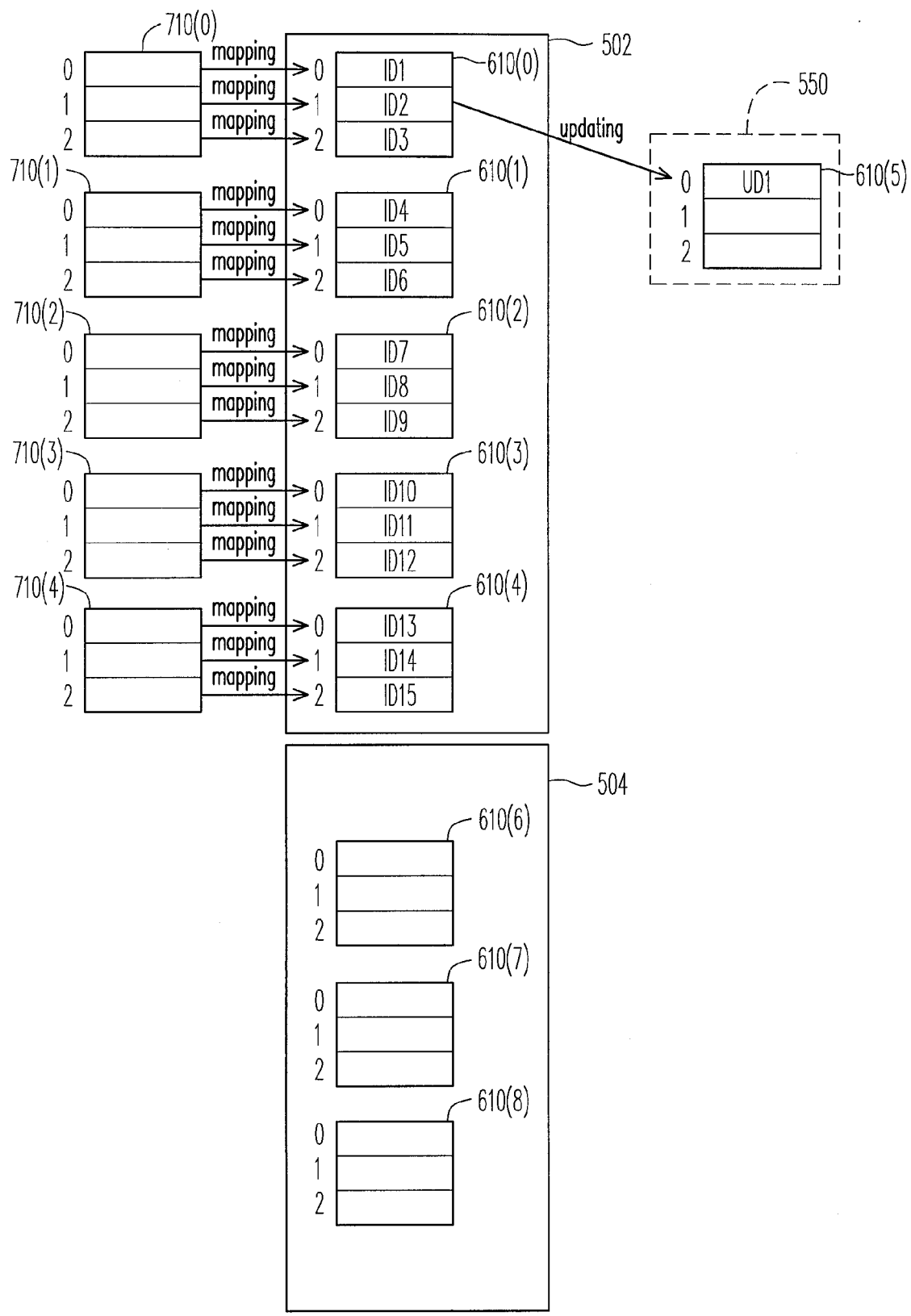

With reference of FIG. 5B, if updated data UD1 is to be programmed and the updated data UD1 belongs to a first logical page of the logical units 710(0), the memory management circuit 202 selects a physical unit 610(5) from the spare area 504 as a physical unit for a global random area 550 and issues a program command to writes the updated data UD1 into a zeroth physical page of the physical units 610(5).

Figure 5C:
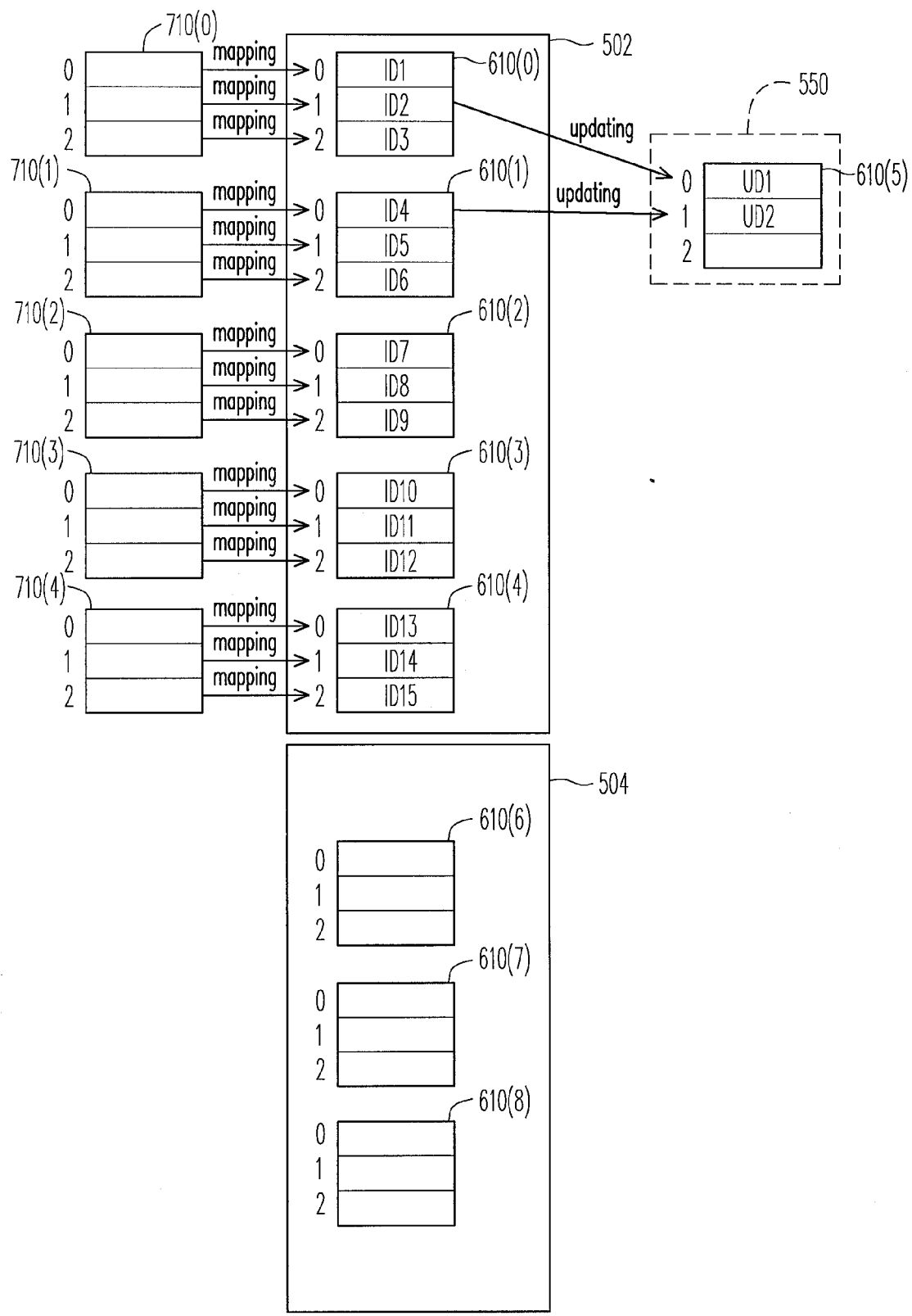

Referring to FIG. 5C, if updated data UD2 is to be programmed following the status shown in FIG. 5B and the updated data UD2 belongs to a zeroth logical page of the logical units 710(1), the memory management circuit 202 issues a program command to writes the updated data UD2 into a first physical page of the physical units 610(5).

Figure 5D:
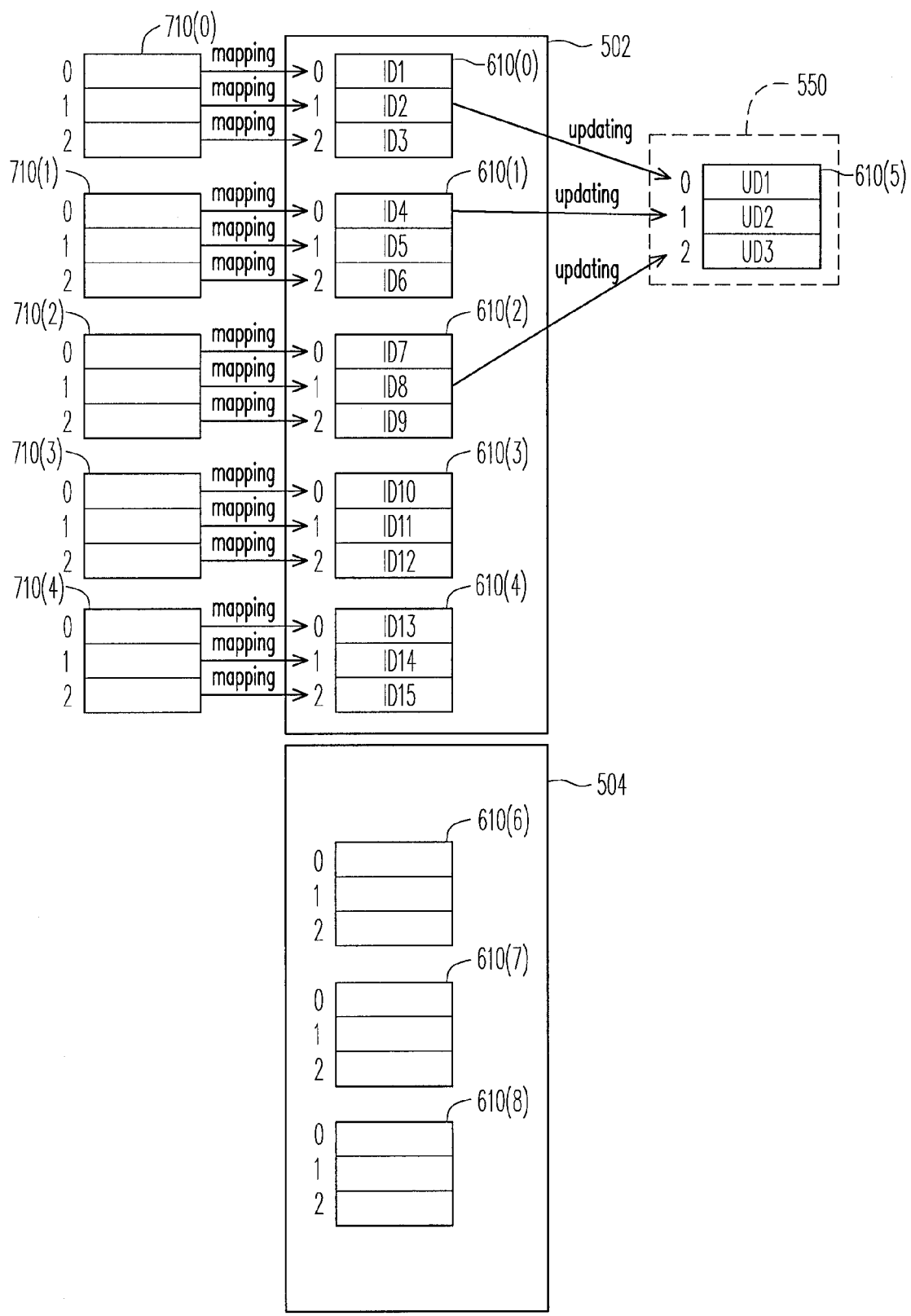

Referring to FIG. 5D, if updated data UD3 is to be programmed following the status shown in FIG. 5C and the updated data UD3 belongs to the first logical page of the logical units 710(2), the memory management circuit 202 issues a program command to writes the updated data UD3 into a second physical page of the physical units 610(5).

Figure 5E:
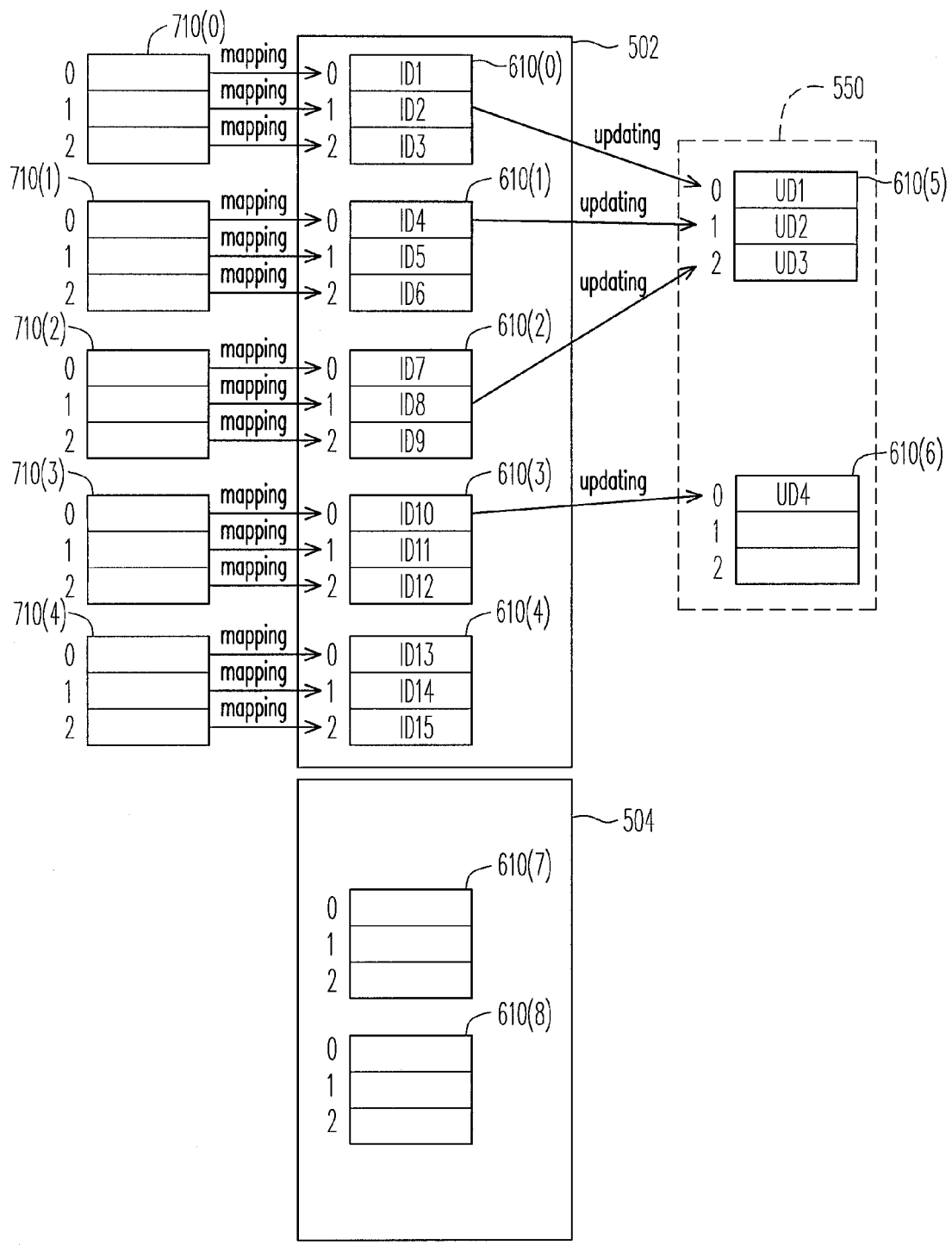

Referring to FIG. 5E, if updated data UD4 is to be programmed following the status shown in FIG. 5D and the updated data UD4 belongs to the zeroth logical page of the logical units 710(3), because the global random physical unit 610(5) does not have any storage space, the memory management circuit 202 selects a physical unit 610(6) as a physical unit for the global random area 550 and issues a program command to writes the updated data UD4 into the zeroth physical page of the physical units 610(6).

Figure 5F:
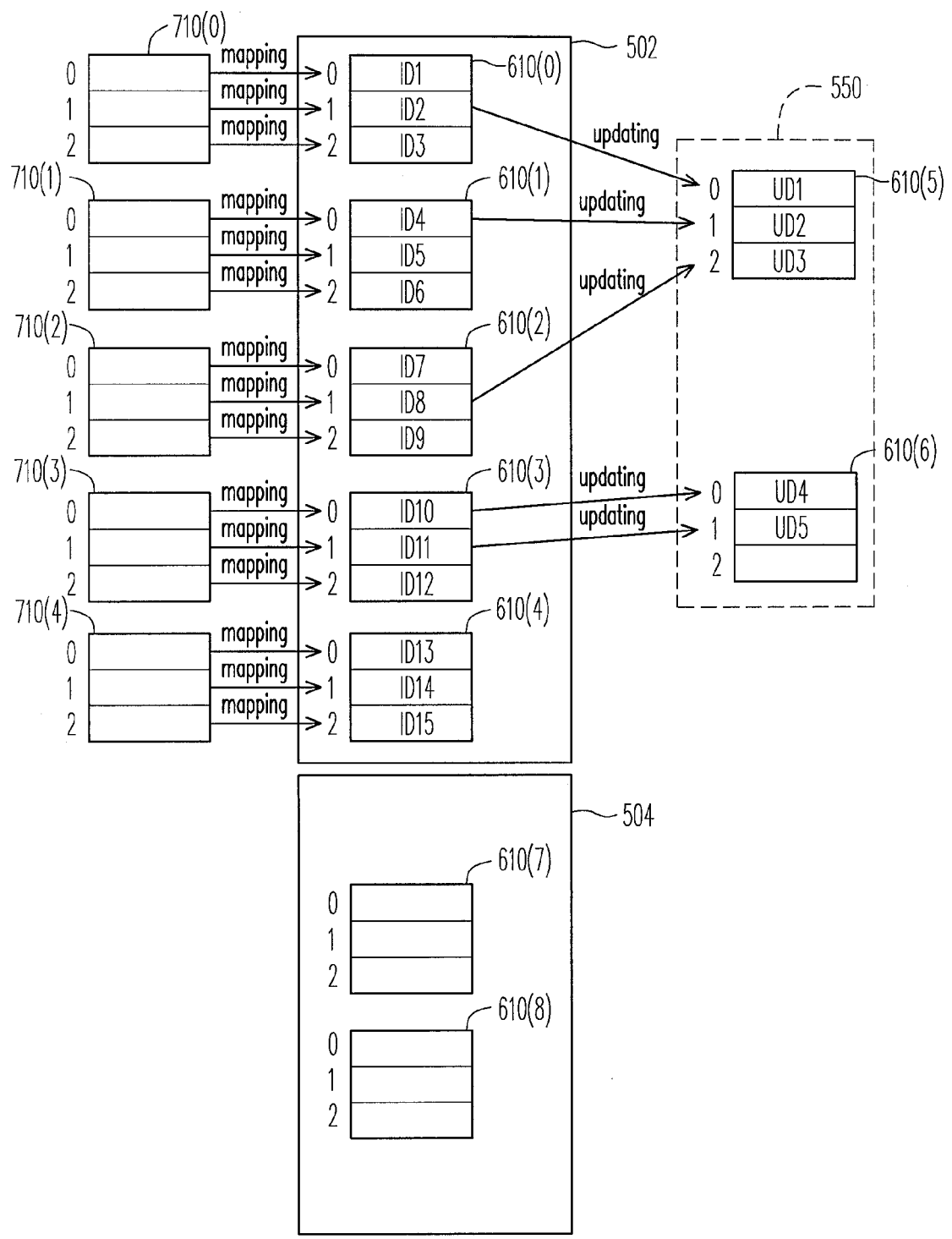

Referring to FIG. 5F, if updated data UD5 is to be programmed following the status shown in FIG. 5E and the updated data UD5 belongs to the first logical page of the logical units 710(3), the memory management circuit 202 issues a program command to writes the updated data UD5 into the first physical page of the physical units 610(6).

Figure 5G:
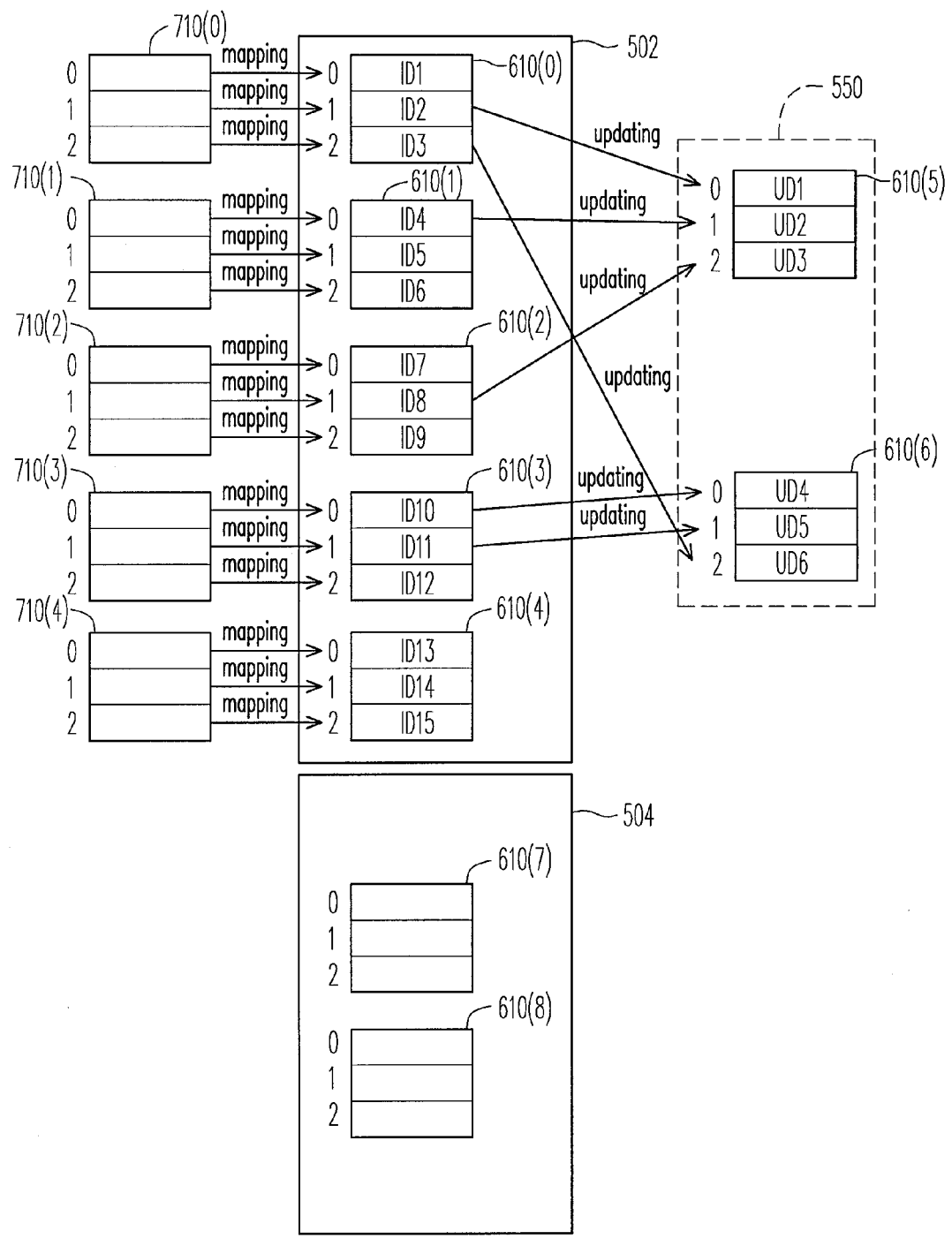

Referring to FIG. 5G, if updated data UD6 is to be programmed following the status shown in FIG. 5F and the updated data UD6 belongs to a second logical page of the logical units 710(0), the memory management circuit 202 issues a program command to writes the updated data UD6 into the second physical page of the physical units 610(6).

To be able to identify the logical pages (i.e. updated logical pages) of the logical units (i.e. updated logical units) that the data stored in the physical units of the global random area belongs to, in the present exemplary embodiment, the memory management circuit 202 builds a global random area searching table to search the data effectively. Here, the logical pages which the updated data temporarily stored in the global random area belong to are referred to as updated logical pages and the logical units which the updated logical pages belong to are referred to as updated logical units. In the global random area searching table, the memory management circuit 202 builds a plurality of root units and configures an entry link for each root unit. Particularly, the memory management circuit 202 groups the logical pages of the logical units for corresponding to each of the root units and records the updated data of the updated logical pages on the entry links of the corresponding root units. Therefore, when the updated data of a logical unit is to be searched in the global random physical unit, only searching for the entry link of the corresponding root unit is needed.

For instance, in the present exemplary embodiment, the memory management circuit 202 respectively groups the logical pages of each logical unit into the same root unit. Namely, the logical pages in the same logical unit correspond to the same root unit. It is noted that, the present invention is not limited thereto, for example, in another exemplary embodiment, a part of the logical pages in a logical unit may be grouped into a root unit and another part of the logical pages of the logical unit may be grouped into another root unit.

Additionally, the memory management circuit 202 sets an entry link for each root unit and when executing a write command, the memory management circuit 202 builds an entry on the corresponding entry link for recording the updated data of the write command. For instance, each entry includes a first field (such as field 902 in FIG. 6), a second field (such as field 904 in FIG. 6) and a third field (such as field 906 in FIG. 6), wherein the first field records the address of the updated logical page, the second field records the physical address storing the updated data of the updated logical page, and the third field marks whether the entry is valid or not. Here, if the entry is valid, the third field, for example, is marked as '1'; and if the entry is invalid, the third field, for example, is marked as '0'. It is noted that, the way of marking the valid entry and the invalid entry is not limited thereto. For example, '1' may be used for indicating that the entry is invalid and '0' may be used for indicating that the entry is valid.

Figure 6:
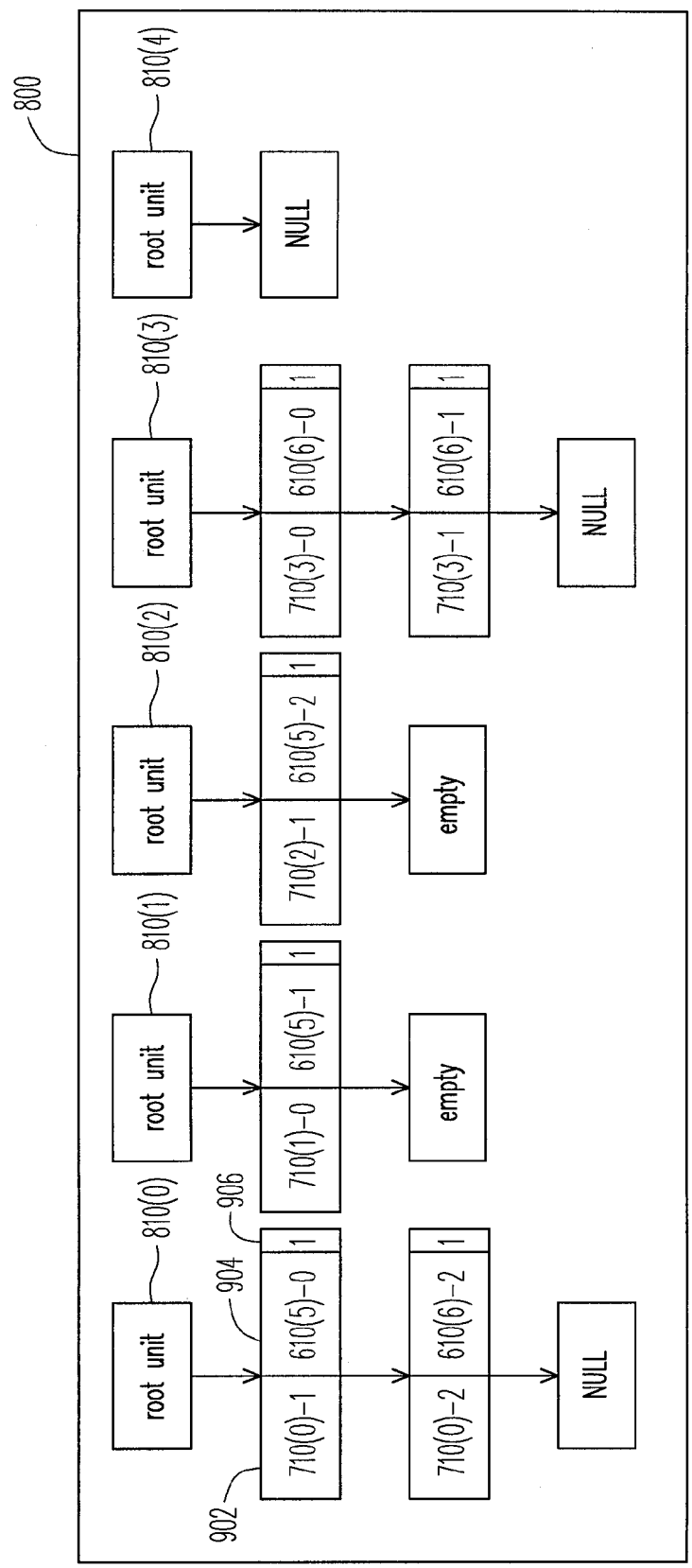
FIG. 6 is the simplified example of a global random area searching table according to FIG. 5G.

FIG. 6 is the simplified example of a global random area searching table according to FIG. 5G.

Referring to FIG. 6, a global random area searching table 800 includes root units 810(0)-810(4), wherein the logical pages of the logical unit 710(0) corresponds to the root unit 810(0), the logical pages of the logical unit 710(1) corresponds to the root unit 810(1), the logical pages of the logical unit 710(2) corresponds to the root unit 810(2), the logical pages of the logical unit 710(3) corresponds to the root unit 810(3), and the logical pages of the logical unit 710(4) corresponds to the root unit 810(4).

The entry link of the root unit 810(0) includes 2 valid entries to record that a first logical page (i.e. information "710(0)-1") and a second logical page (i.e. information "710(0)-2") of the logical unit 710(0) have been updated, wherein the updated data of the first logical page of the logical unit 710(0) is written into the zeroth physical page of the physical unit 610(5) (i.e. information "610(5)-0") and the updated data of the second logical page of the logical unit 710(0) is written into the second physical page of the physical unit 610(6) (i.e. information "610(6)-2").

The entry link of the root unit 810(1) includes one valid entry to record that the zeroth logical page of the logical unit 710(1) (i.e. information "710(1)-0") has been updated, wherein the updated data of the zeroth logical page of the logical unit 710(1) is written into the first physical page of the physical unit 610(5) (i.e. information "610(5)-1").

The entry link of the root unit 810(2) includes one valid entry to record that the first logical page of the logical unit 710(2) (i.e. information "710(2)-1") has been updated, wherein the updated data of the first logical page of the logical unit 710(2) is written into the second physical page of the physical unit 610(5) (i.e. information "610(5)-2").

The entry link of the root unit 810(3) includes 2 valid entries to record that a first logical page (i.e. information "710(3)-1") and a second logical page (i.e. information "710(0)6") of the logical unit 710(0) have been updated, wherein the updated data of the zeroth logical page of the logical unit 710(3) is written into the zeroth physical page of the physical unit 610(6) (i.e. information "610(6)-0") and the updated data of the first logical page of the logical unit 710(3) is written into the first physical page of the physical unit 610(6) (i.e. information "610(6)-1").

Additionally, the entry links of the root units 810(0)-810(4) respectively includes a null entry to represent the end of the entry links For instance, when the data belonging to the logical unit 710(4) is to be searched in the global random physical unit, the memory management unit 202 may identify that there is no data belonging to the logical unit 710(4) in the global random physical units based on the entry link of the root unit 810(4), which only has the null entry, thereby reading the data from the physical pages of the corresponding physical unit according to the information of the logical unit-physical unit mapping table.

By the same token, the memory management circuit 202 orderly writes data to be stored in the host system 1000 into the physical units severed as the global random area. Particularly, when the number of the physical units severed as the global random area reaches 3, the memory management circuit 202 executes a data emerging operation while executing a write command to prevent the physical units of the spare area from exhausting.

Figure 7A:
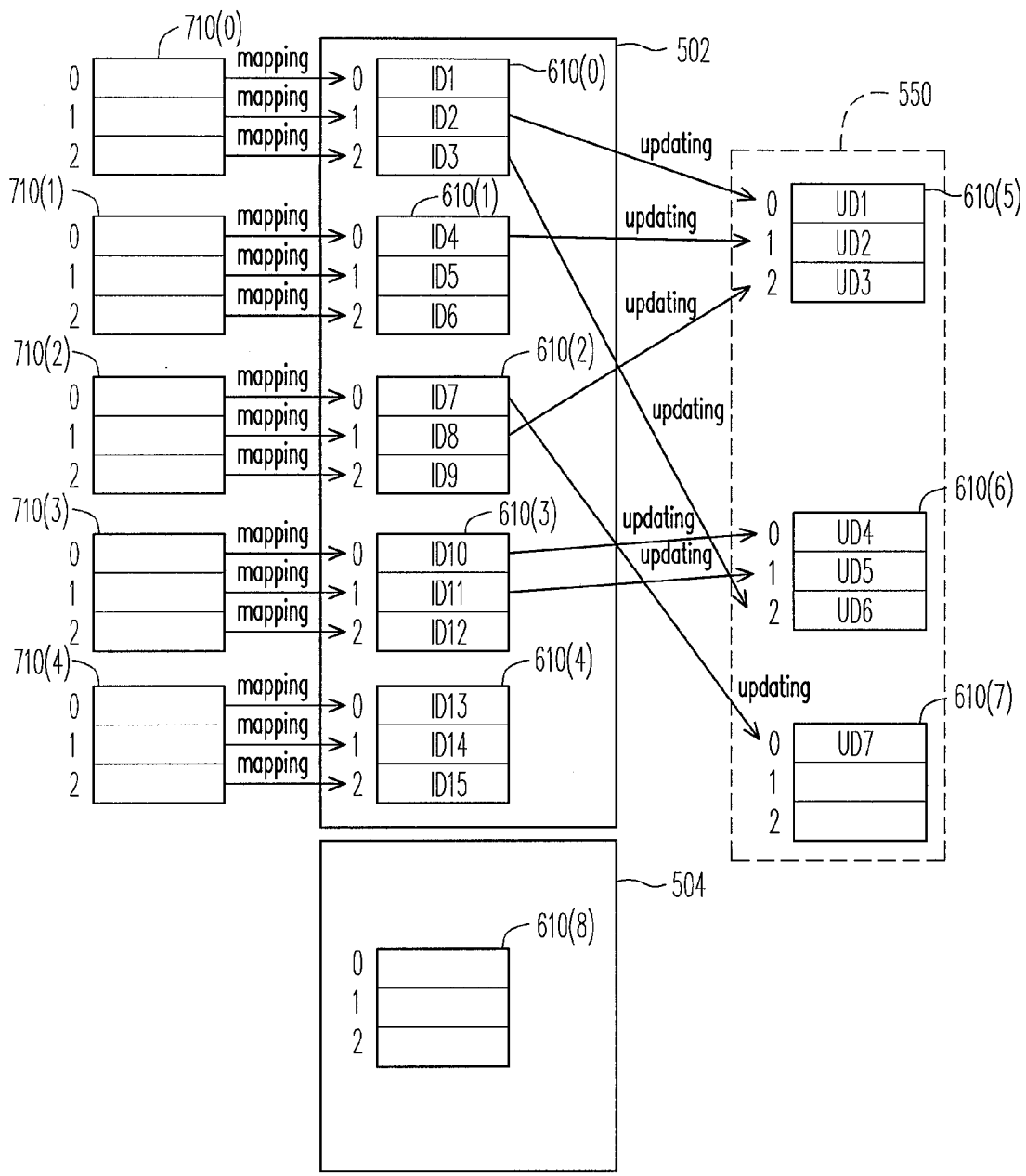
FIGS. 7A and 7B illustrate the simplified examples of writing data using a global random area and performing the data merging operation.
Figure 7B:
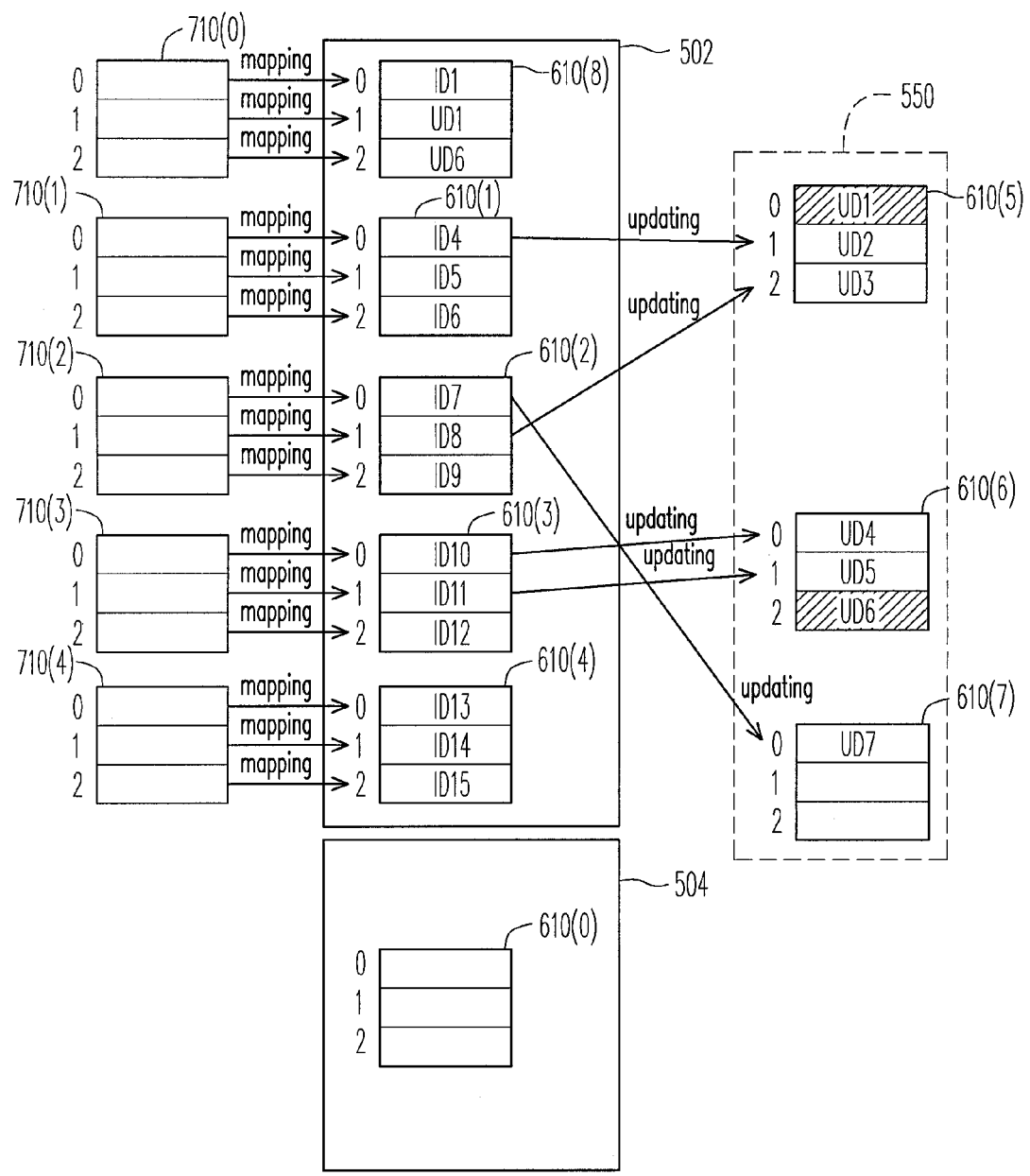

FIGS. 7A and 7B illustrate the simplified examples of writing data using a global random area and performing the data merging operation.

Referring to FIG. 7A, if updated data UD7 is to be programmed following the status shown in FIG. 5G and the updated data UD7 belongs to the zeroth logical page of the logical units 710(2), because the global random physical unit 610(5) does not have any storage space, the memory management circuit 202 selects a physical unit 610(7) as a physical unit for the global random area 550 and issues a program command to writes the updated data UD7 into the zeroth physical page of the physical units 610(7). In particular, when the number of the physical units of the global random area 550 reaches 3, the memory management circuit 202 executes a data emerging operation after the writing operation. Namely, in this example, while executing the writing command, the memory management circuit 202 executes the data emerging operation.

Referring to FIG. 7B, if the logical unit 710(0) is selected to merge data, the memory management circuit 202 identifies that the logical unit 710(0) maps to the physical unit 610(0) and selects the physical unit 610(8) from the spare area 504, and copy the valid data belonging to logical unit 710(0) in the physical unit 610(0) and the global random area 550 to the physical unit 610(8). In detail, the memory management circuit 202 orderly writes the data ID 1 in the physical unit 610(0), the data UD 1 in the physical unit 610(5) and the data UD6 in the physical unit 610(6) into the zeroth~second physical pages of the physical unit 610(8) and marks the first physical page of the physical unit 610(5) and the second physical page of the physical unit 610(6) as invalid pages (as shown in oblique lines). Afterwards, the memory management circuit 202 executes an erase operation on the physical unit 610(0), re-maps the logical unit 710(0) to the physical unit 610(8) in the logical unit-physical unit mapping table, and associates the physical unit 610(0) with the spare area 504.

For instance, the memory management circuit 202 executes the data emerging operation on the logical unit 710 (1) when executing a next write command, and then executes the data emerging operation on the logical unit 710(2) when again executing a next write command Therefore, when the storage space of the physical unit 610(7) is filled, the data in the physical unit 610(5) become invalid. Accordingly, the memory management circuit 202 may execute the erase operation on the physical unit 610(5) and associate the erased physical unit 610(5) with the spare area 504.

Or, for example, when executing a next write command, the memory management circuit 202 executes the data emerging operation on the logical unit 710(3). Therefore, when the storage space of the physical unit 610(7) is filled, the data in the physical unit 610(6) become invalid. Accordingly, the memory management circuit 202 may execute the erase operation on the physical unit 610(6) and associate the erased physical unit 610(6) with the spare area 504.

Therefore, according to the operations described above, the memory management circuit 202 may continuingly associate the physical units storing invalid data with the spare area 504 and select an empty physical unit from the spare area 504 as a global random physical unit.

It should be noted that, in the present exemplary embodiment, the number of the logical units, which the updated data temporarily stored in the global random area 550 belongs to, is limited to be not greater than the predetermined number. Namely, at the same time, the memory management circuit 202 only temporarily stores the updated data belonging to a portion of the logical unit in the global random area 550, and the number of the portion of the logical units is not greater than the predetermined number. In other words, the predetermined number is set to be smaller than the total number of the logical units. In detail, as described above, the addresses of the updated logical pages in the global random area searching table is identified by the information recorded on the first field. Therefore, in the global random area searching table from the prior art, the size of the first field must be enough to record the information which can differentiate all the logical pages. For instance, when the number of the logical units is 1024, the first field in the global random area searching table from the prior art must be configured 10 bytes to be able to record the information configured to differentiate all the logical pages.

In the present exemplary embodiment, the size of the first field 902 is designed to be smaller and not be able to record the information configured to differentiate all the logical pages. For instance, the size of the first field 902 is 7 bytes, and may only record the information configured to differentiate the addresses of the logical pages of 128 logical units (i.e. index number). Therefore, the predetermined number described above may be set as 128 and the memory management circuit 202 only temporarily stores updated data belonging to 128 logical units in the global random area 550 at most. Accordingly, the size of the global random area searching table 800 may be effectively reduced and the global random area searching table 800 may be loaded into the buffer memory 252 having smaller capacity.

When updated data belonging to the logical page of a logical unit is written into the global random area 550, the memory management circuit 202 assigns an index number to the logical unit and records the updated data of the logical page according to the index number in the global random area searching table 800. For example, in the present exemplary embodiment, the range of the index numbers is from 0 to 127 and the memory management circuit 202 configures an index number mapping table to record each index number assigned to each of the updated logical units. That is, each updated logical unit is assigned one of the index numbers (i.e. 0-127) and the index number is recorded in the first field of the global random area searching table 800 to replace the original record related to the logical unit which the logical pages belong to.

FIG. 8 illustrates an example of an index number mapping table according to the first exemplary embodiment of the present invention.

Referring to FIG. 8, if the updated data belonging to the zeroth logical page of the logical unit 710(0) is written into the global random area 550, the memory management circuit 220 assigns the index numbers '0', which not used in the index number mapping table 900, to the logical unit 710(0).

Additionally, after the process of the data emerging operation (as shown in FIG. 7B), if the global random area 550 does not store updated data belonging to the logical unit 710(0), the index number '0' assigned to the logical unit 710(0) is deleted. Accordingly, during the following writing operation, the index number '0' may be assigned to other updated logical units.

That is, when data is to be stored in a logical page of a logical unit by the host system 1000, the memory management circuit 202 determines whether the global random area 550 has stored data belonging to the logical unit. For example, the memory management circuit 202 determines whether the logical unit has been assigned an index number or not according to the index number mapping table, wherein when the logical unit has been assigned an index number, the memory management circuit 202 identifies that the global random area 550 has stored the data belonging to the logical unit. When the global random area 550 has stored the data belonging to the logical unit, the memory management circuit 202 writes the updated data belonging the to logical page into the global random area 550 and uses the index number assigned to the logical unit to record the updated data corresponding to the logical page in the global random area searching table.

When the global random area 550 does not store data belonging to the logical unit, the memory management circuit 202 determines whether the number of the logical units, which the updated data temporarily stored in the global random area 550 belongs to, is smaller than the predetermined number. For instance, the memory management circuit 202 determines whether there is still any un-assigned index number in the index number mapping table. When there is an un-assigned index number in the index number mapping table, the memory management circuit 202 identifies that the number of the logical units, which the updated data temporarily stored in the global random area 550 belongs to, is smaller than the predetermined number.

If the number of the logical units, which the updated data temporarily stored in the global random area 550 belongs to, is smaller than the predetermined number, the memory management circuit 202 assigns an un-used index number to the logical unit, writes the updated data belonging to the logical pages into the global random area 550 and uses the index number assigned to the logical unit to record the updated data corresponding to the logical pages in the global random area searching table.

If the number of the logical units, which the updated data temporarily stored in the global random area 550 belongs to, is not smaller than the predetermined number (i.e. no any unused index number can be assigned to the logical unit to be written), the memory management circuit 202 selects a physical unit from the spare area 504 as a child physical unit to write the updated data.

Figure 9:
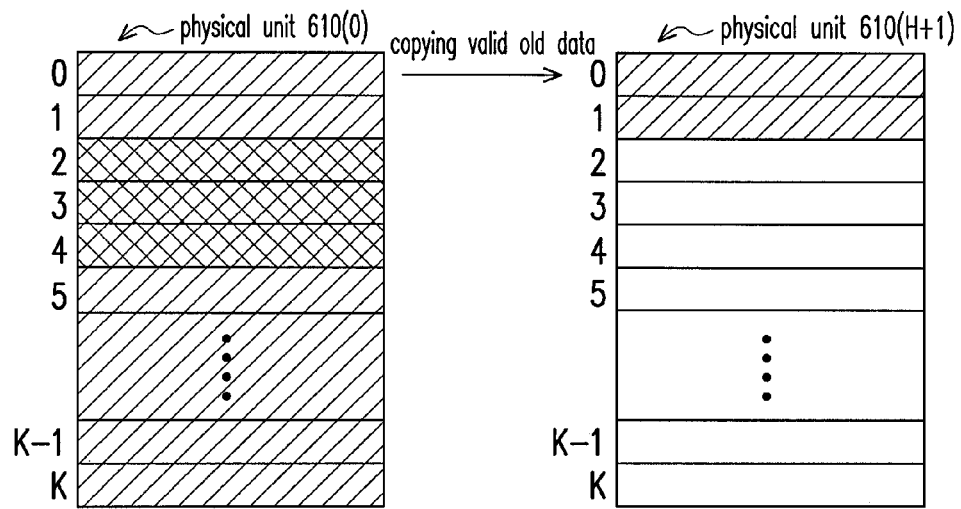
FIGS. 9-11 illustrate an example of writing updated data using a child physical unit.
Figure 10:
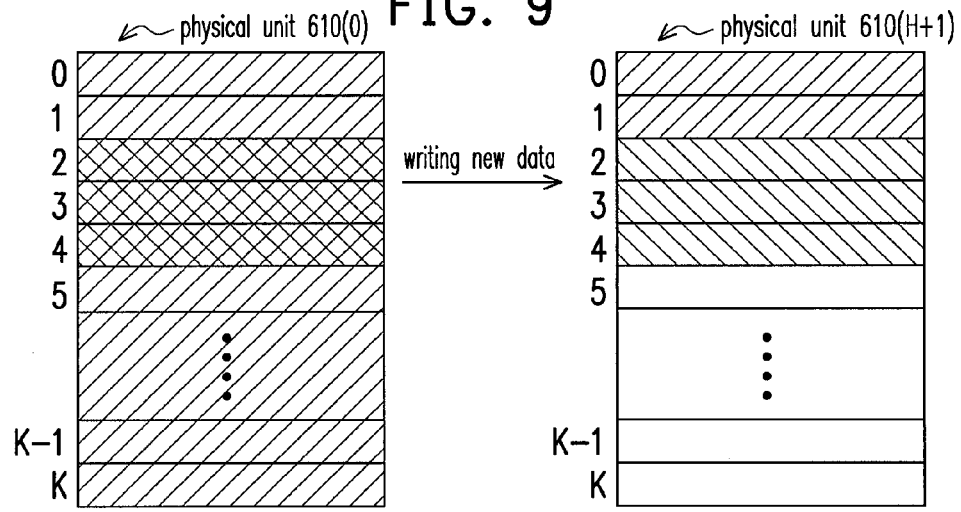
Figure 11:
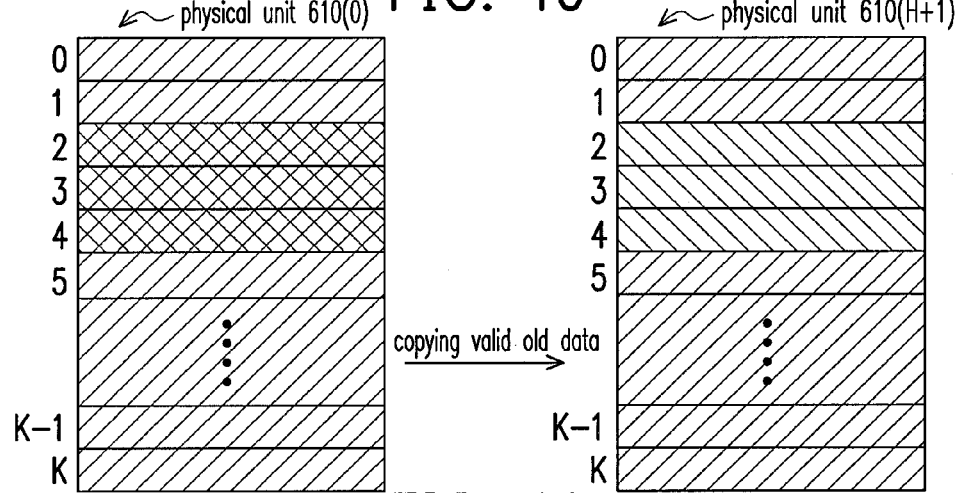

FIGS. 9-11 illustrate an example of writing updated data using a child physical unit.

Referring to FIGS. 9-11, for example, when the logical block 710(0) currently maps to the physical block 610(0) and the memory controller 104 receives a write command from the host system 1000 to write data into the logical pages belonging to the logical unit 710(0), the memory management circuit 202 identifies that the logical unit 710(0) currently maps to the physical unit 610(0) based on the logical unit-physical unit mapping table and selects a physical unit 610(H+1) from the spare area 504 as a substitute physical unit for substituting the physical unit 610(0). However, when writing the new data into the physical unit 610(H+1), the memory management circuit 202 does not have to instantly move all the valid data in the physical unit 610(0) to the physical unit 610(H+1) and erase the physical unit 610(0). Specifically, the memory management circuit 202 reads the valid data before the physical pages to be written from the physical unit 610(0) (i.e. the data in the zeroth physical page and the first physical page of the physical unit 610(0)). Afterwards, the memory controller 105 writes the valid data before the physical pages to be written into the zeroth physical page and the first physical page of the physical unit 610(H+1) (as shown in FIG. 9), and writes the new data into the second to the fourth physical pages of the physical unit 610(H+1) (as shown in FIG. 10). At this time, the memory controller 104 completes the writing operation. Because the valid data in the physical unit 610(0) may become invalid during a next operation (for example, a next write command), instantly moving all the valid data in the physical unit 610(0) to the physical unit 610(H+1) may become meaningless. Moreover, data must be orderly written into the physical pages of the physical units, therefore, the memory management circuit 202 may move the valid data before the physical page to be written (e.g., the data stored in the zeroth physical page and the data of the first physical page of the physical unit 610(0)), and temporarily does not move the rest of the valid data (e.g., the data stored in the fifth-Kth physical pages of the physical unit 610(0)).

In the present exemplary embodiment, the operation of maintaining such a temporary relationship is referred to as opening mother-child blocks, and the original physical unit (e.g., the physical unit 610(0)) is referred to as a mother physical unit, and the substitute physical unit (e.g., the physical unit 610(H+1)) is referred to as a child physical unit.

Thereafter, the memory controller 104 integrates the physical unit 610(0) and the physical unit 610(H+1) into one single physical unit when the data of the physical 610(0) and the physical unit 610(H+1) are required to be merged, so that the efficiency of using physical units can be improved. Here, the operation of merging the mother-child blocks is referred to as a data merging operation or closing mother-child blocks. For instance, as shown in FIG. 11, while closing mother-child blocks, the memory management circuit 202 reads the rest of the valid data from the physical unit 610(0)(i.e., the data in the fifth-Kth physical pages of the physical unit 610(0)), writes the rest of the valid data in the physical unit 610(0) into the fifth-Kth physical pages of the physical unit 610(H+1), performs the erase operation on the physical unit 610(0), associates the erased physical unit 610(0) with the spare area 504 and associates the physical unit 610(H+1) with the data area 502. Namely, the memory controller 104 re-maps the logical unit 710(0) to the physical unit 610 (H+1) in the logical unit-physical unit mapping table. It should be noted that, because the number of the physical units in the spare area 504 is limited, the number of the opened mother-child blocks is also limited during the operation of the memory storage apparatus 100. Therefore, when the memory storage apparatus 100 receives a write command from the host system 1000 and the number of opened mother-child blocks reaches the maximum, the memory controller 104 must close one of the opened mother-child blocks, so as to execute the write command.

It should be noted that, in the present exemplary embodiment, when the number of the logical units, which the updated data temporarily stored in the global random area 550 belongs to, is not smaller than the predetermined number, the memory management circuit 202 uses the child physical unit to write the updated data. However, the present invention is not limited thereto. In another exemplary embodiment, the memory management circuit 202 may also execute the data emerging operation as shown in FIG. 7B, copy the valid data belonging to an updated logical unit to the physical unit selected from the spare area 504 and re-map the logical unit to the physical unit, such that the number of the logical units, which the updated data temporarily stored in the global random area 550 belongs to, is smaller than the predetermined number and the new updated data may be written into the global random area 550.

Figure 12A:
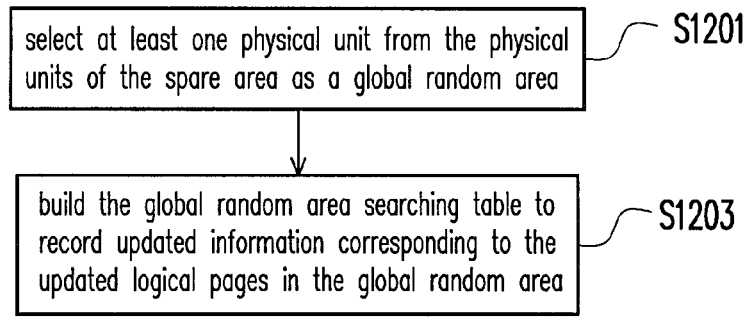
FIGS. 12A and 12B are flowcharts illustrating a data writing method according to the first exemplary embodiment of the present invention.
Figure 12B:
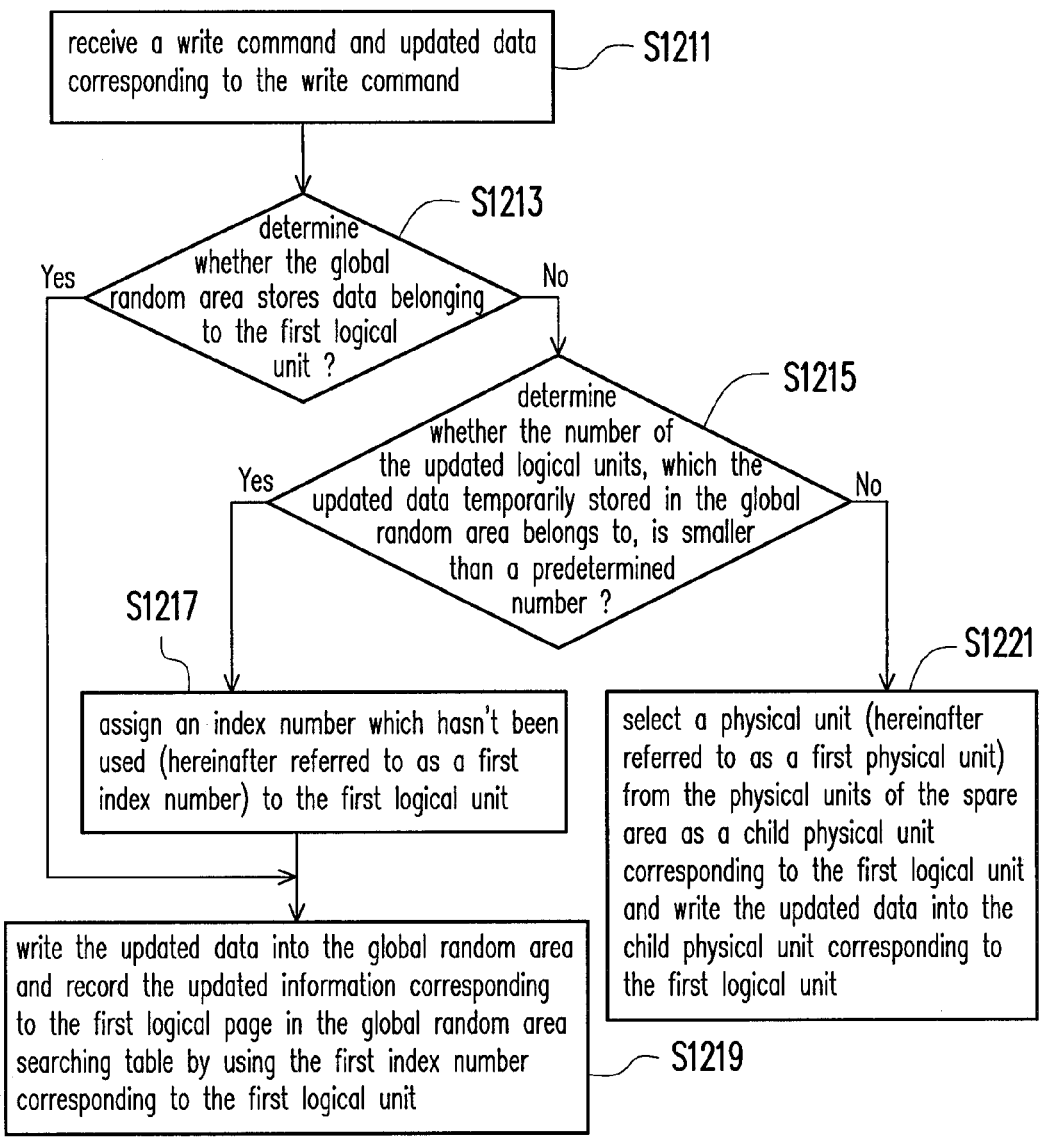

FIGS. 12A and 12B are flowcharts illustrating a data writing method according to the first exemplary embodiment of the present invention, wherein FIG. 12A illustrates the steps of setting a global random area 550 and a global random area searching table and FIG. 12B illustrates the steps of writing data.

Referring to FIG. 12A, in step S1201, at least one physical unit from the physical units of the spare area 504 is selected as a global random area 550. Here, the global random area 550 is used for temporarily storing data belonging to a plurality of updated logical pages of a plurality of updated logical units.

In step S1203, the global random area searching table is built to record updated information corresponding to the updated logical pages in the global random area. In particular, the number of the logical units which can be assigned to the global random area is smaller than the number of the logical units belonging to the apparatus. Furthermore, the information of the logical units which the updated logical pages belong to may be recorded in the global random area searching table by using the assigned index numbers. For example, in step S1203, an index number mapping table is built to record the mapping relationship between the updated logical units and the index numbers.

Referring to FIG. 12B, when the host system 1000 issues a write command to write updated data into a logical page (hereinafter referred to as a first logical page of a first logical unit), in step S1211, the write command and the updated data corresponding to the write command are received, and in step S1213, whether the global random area 550 stores data belonging to the first logical unit is determined.

If the global random area 550 does not store data belonging to the first logical unit, in step S1215, whether the number of the updated logical units, which the updated data temporarily stored in the global random area 550 belongs to, is smaller than a predetermined number is determined, wherein the predetermined number is smaller than the total number of the logical units belonging to the apparatus.

If the number of the updated logical units is smaller than the predetermined number, in step S1217, an index number which hasn't been used (hereinafter referred to as a first index number) is assigned to the first logical unit. Thereafter, in step S1219, the updated data is written into the global random area 550 and the updated information corresponding to the first logical page is recorded in the global random area searching table by using the first index number corresponding to the first logical unit.

If the number of the updated logical units is not smaller than the predetermined number, in step S1221, a physical unit (hereinafter referred to as a first physical unit) is selected from the physical units in the spare area as a child physical unit corresponding to the first logical unit and the updated data is written into the child physical unit corresponding to the first logical unit.

If the global random area 550 stores data belonging to the first logical unit, step S1219 is performed.

Second Exemplary Embodiment

The difference between the first exemplary embodiment and the second exemplary embodiment is that besides blocks management steps and the data writing steps described above, in the second exemplary embodiment, when a write command and updated data are received, whether the logical units which the updated data belongs to is a frequently written area is further determined, and only the updated data belonging to the frequently written area can be written into the global random area. The hardware frameworks of the memory controller and the memory storage apparatus in the second exemplary embodiment is substantially the same as the hardware frameworks of the memory controller and the memory storage apparatus in the first exemplary embodiment. The hardware frameworks of the first exemplary embodiment are used for describing the second exemplary embodiment in the following.

In the second exemplary embodiment, the memory management circuit 202 of the memory controller 104 records a writing count corresponding to each logical unit. For example, when the host system stores data in a logical unit, the writing count corresponding to the logical unit is added by 1. Furthermore, the memory management circuit 202 groups the logical units into a hot logical area which is often used and a cold logical area which is less used according to the writing counts. For instance, in the present exemplary embodiment, the memory management circuit 202 sorts the logical units according to the writing counts and groups the top 80% of the logical units to the hot logical area and groups the rest of the logical units to the cold logical area. Grouping the hot logical area and the cold logical area according to the writing counts is only an example. The present invention is not limited thereto.

In the present exemplary embodiment, when data is to be written into a logical page of a logical unit by the host system 1000, the memory management circuit 202 determines whether the logical unit belongs to the cold logical area.

If the logical unit belongs to the cold logical area, the memory management circuit 202 writes the updated data by using a child physical unit. Moreover, if the logical unit does not belong to the cold logical area, the memory management circuit 202 determines whether to write the updated data into the global random area 550 or not according to the storage status of the global random area 550. Namely, only when the logical unit, which the updated data belongs to, belongs to the hot logical area, the memory management circuit 202 determines whether the global random area 550 stores data belonging to the logical unit and whether the number of the logical units, which the updated data temporarily stored in the global random area 550 belongs to, is smaller than the predetermined number, and thus determines whether to writes the updated data into the global random area 550 or not according to the determination (as described in the first exemplary embodiment).

Figure 13:
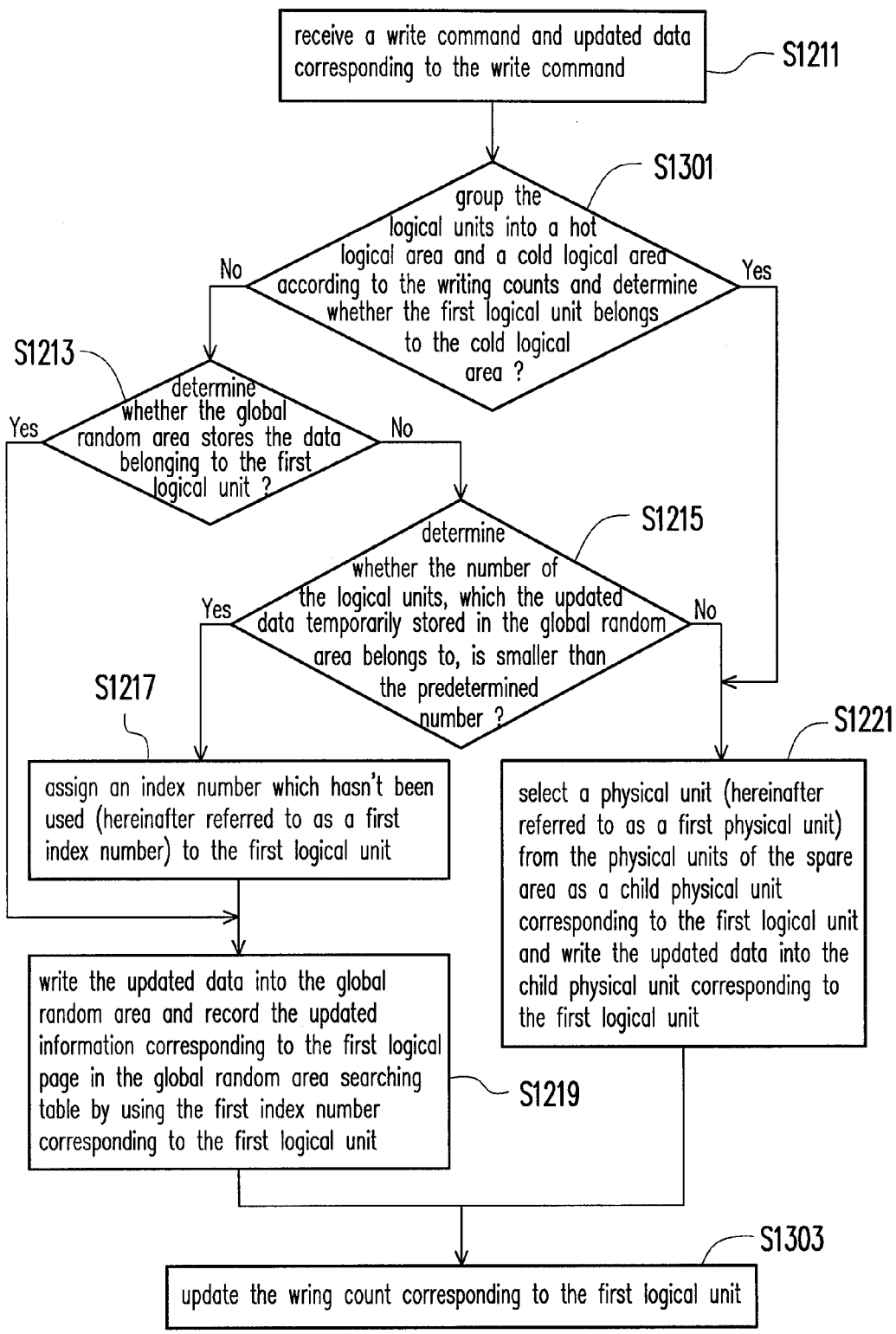
FIG. 13 is a flowchart of writing data according to the second exemplary embodiment of the present invention.

FIG. 13 is a flowchart of writing data according to the second exemplary embodiment of the present invention.

Referring to FIG. 13, when the host system 1000 issues a write command to write updated data to a logical page (hereinafter referred to as a first logical page of a first logical unit), in step S1211, the write command and the updated data corresponding to the write command are received, and in step S1301, the logical units are grouped into a hot logical area and a cold logical area according to the writing counts and whether the first logical unit belongs to the cold logical area is determined.

If the first logical unit does not belong to the clod logical area, in step S1213, whether the global random area 550 stores data belonging to the first logical unit is determined.

When the global random area 550 does not store the data belonging to the first logical unit, in step S1215, whether the number of the logical units, which the updated data temporarily stored in the global random area 550 belongs to, is smaller than the predetermined number is determine.

If the number of the updated logical units is smaller than the predetermined number, in step S1217, an index number which hasn't been used (hereinafter referred to as a first index number) assigned to the first logical unit. Thereafter, in step S1219, the updated data is written into the global random area 550 and the updated information corresponding to the first logical page is recorded in the global random area searching table by using the first index number corresponding to the first logical unit.

If the number of the updated logical units is not smaller than the predetermined number, in step S1221, a physical unit (hereinafter referred to as a first physical unit) is selected from the physical units in the spare area as a child physical unit corresponding to the first logical unit and the updated data is written into the child physical unit corresponding to the first logical unit.

Additionally, if the global random area 550 stores the data belonging to the first logical unit, step S1219 is performed.

Furthermore, if the first logical unit belongs to the cold logical area, step S1221 is performed.

Thereafter, after step S1219 and step S1221, in step 1303, the wring count corresponding to the first logical unit is updated.

Third Embodiment

The difference between the third exemplary embodiment and the first exemplary embodiment is that besides the blocks management steps and the data writing steps described in the first exemplary embodiment, in the third exemplary embodiment, the physical units of the global random area are grouped into two areas(i.e., a first global random area and a second global random area) and first global random area and the second global random area can be written respectively with updated data belonging to the predetermined number of the logical units at most. That is, in the third exemplary embodiment, two global random area searching tables as described in the first exemplary embodiment are configured to record the updated data corresponding to the first global random area and the updated data corresponding to the second global random. The hardware frameworks of the memory controller and the memory storage apparatus in the third exemplary embodiment is substantially the same as the hardware frameworks of the memory controller and the memory storage apparatus in the first exemplary embodiment. The hardware frameworks of the first exemplary embodiment are used for describing the third exemplary embodiment in the following.

Figure 14:
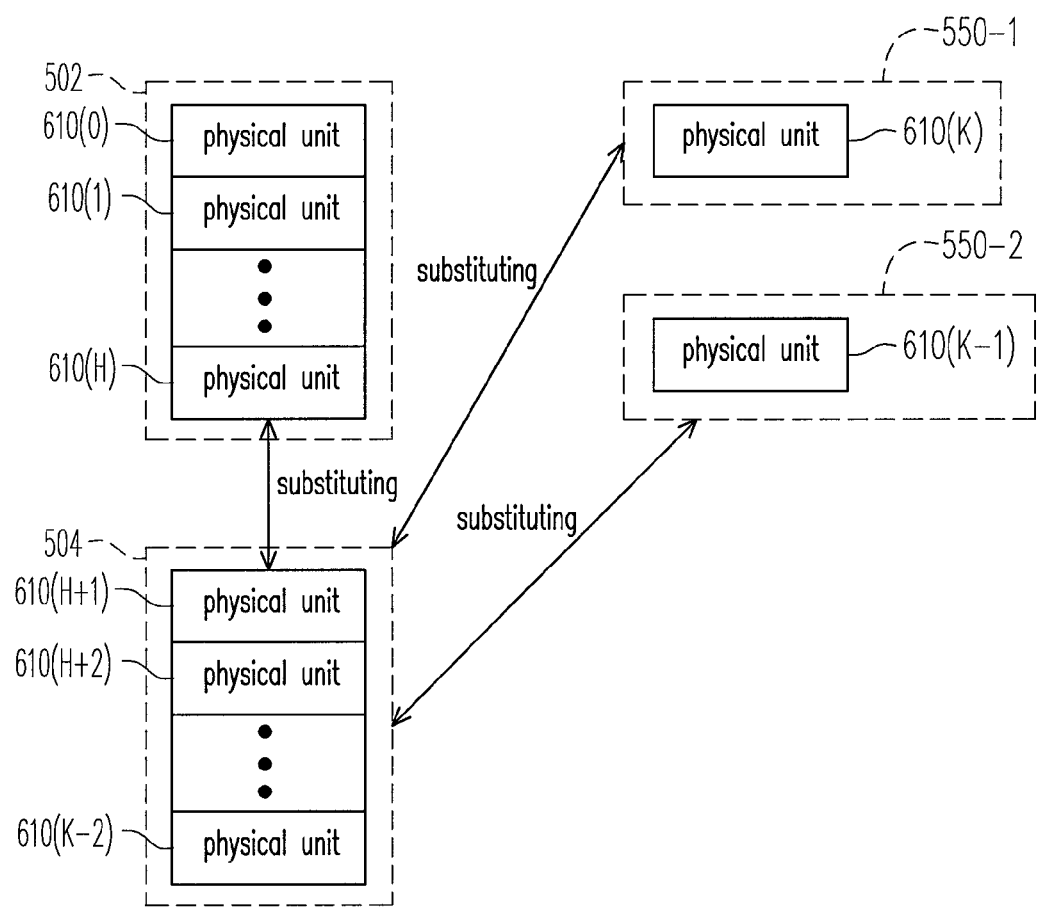
FIG. 14 illustrates an example of setting a global random area according to the third exemplary embodiment of the present invention.

FIG. 14 illustrates an example of setting a global random area according to the third exemplary embodiment of the present invention.

Referring to FIG. 14, the memory management circuit 202 of the memory controller selects physical units from the spare area 504 as a first global random area 550-1 and a second global random area 550-2. Additionally, the memory management circuit 202 respectively configures a first global random area searching table and the second global random area searching table for the first global random area 550-1 and the second global random area 550-2. Here, the data structures and the sizes of the first global random area searching table and the second global random area searching table are the same as the global random area searching table 800.

In the present exemplary embodiment, the memory management circuit 202 respectively stores updated data belonging to different logical units by using the first global random area 550-1 and the second global random area 550-2, wherein the number of the logical units which the updated data temporarily stored in the first global random area 550-1 belongs to is not greater than the predetermined number and the number of the logical units which the updated data temporarily stored in the second global random area 550-1 belongs to is not greater than the predetermined number. For instance, in the case of the predetermined number set as 128, the first global random area 550-1 can store updated data belonging to 128 logical units at most and the second global random area 550-2 can store updated data belonging to 128 logical units at most.

In detail, when data is to be stored in a logical page of a logical unit by the host system 1000, the memory management circuit 202 determines whether the first global random area 550-1 and the second global random area 550-2 have stored data belonging to the logical unit.

When the first global random area 550-1 stores the data belonging to the logical unit, the memory management circuit 202 writes the updated data into the first global random area 550-1 and uses the index number assigned to the logical unit to record the updated information corresponding to the logical page in the first global random area searching table.

When the second global random area 550-2 stores the data belonging to the logical unit, the memory management circuit 202 writes the updated data into the second global random area 550-2 and uses the index number assigned to the logical unit to record the updated information corresponding to the logical page in the second global random area searching table.

When both the first global random area 550-1 and the second global random area 550-2 do not store the data belonging to the logical unit, the memory management circuit 202 determines whether the number of the logical units which the updated data temporarily stored in the first global random area 550-1 belongs to is smaller than the predetermined number.

If the number of the logical units which the updated data temporarily stored in the first global random area 550-1 belongs to is smaller than the predetermined number, the memory management circuit 202 assigns an un-used index number in the first global random area searching table to the logical unit, and writes the updated data belonging to the logical pages into the first global random area 550-1 and uses the index number assigned to the logical unit to record the updated data corresponding to the logical pages in the first global random area searching table.

If the number of the logical units which the updated data temporarily stored in the first global random area 550-1 belongs to is smaller than the predetermined number, the memory management circuit 202 determines whether the number of the logical units which the updated data temporarily stored in the second global random area 550-2 belongs to is smaller than the predetermined number.

If the number of the logical units which the updated data temporarily stored in the second global random area 550-2 belongs to is smaller than the predetermined number, the memory management circuit 202 assigns an un-used index number in the second global random area searching table to the logical unit, and writes the updated data belonging to the logical pages into the second global random area 550-2 and uses the index number assigned to the logical unit to record the updated data corresponding to the logical pages in the second global random area searching table.

If the number of the logical units which the updated data temporarily stored in the second global random area 550-2 belongs to is not smaller than the predetermined number, the memory management circuit 202 selects a physical unit from the spare area 504 as a child physical unit to write the updated data.

Figure 15A:
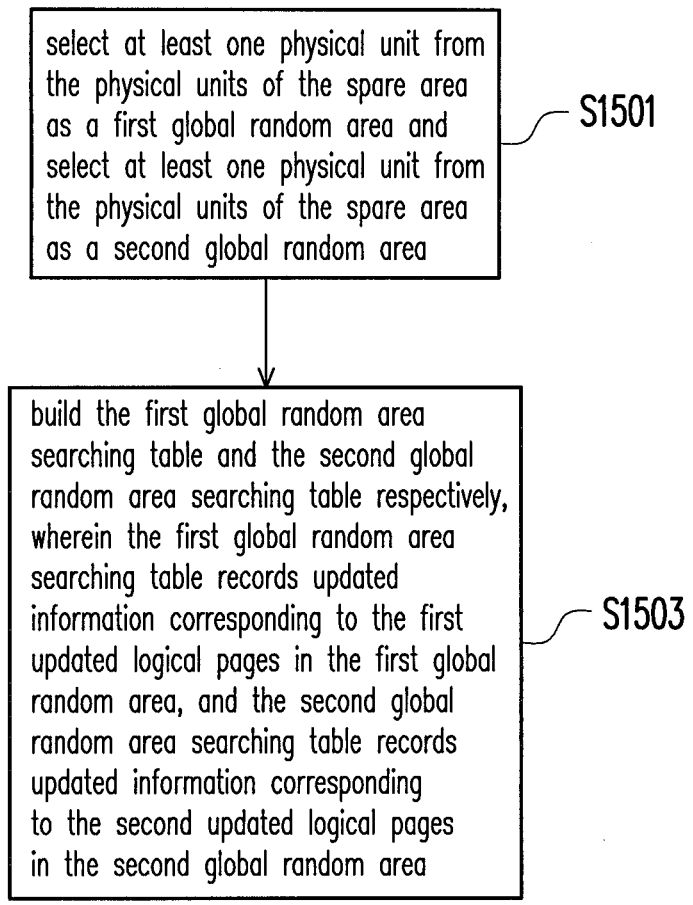
FIGS. 15A and 15B are flowcharts illustrating a data writing method according to the third exemplary embodiment of the present invention.
Figure 15B:
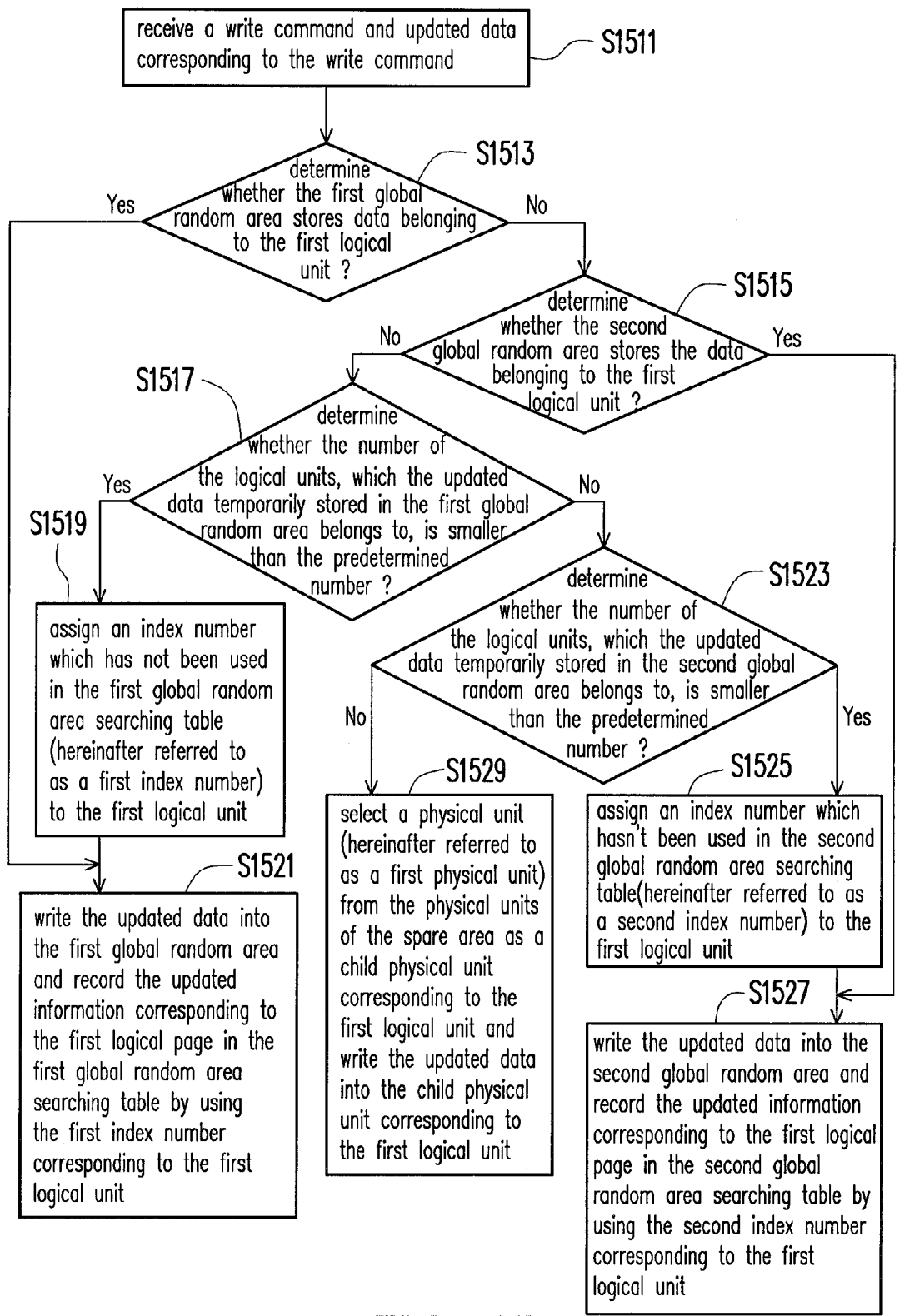

FIGS. 15A and 15B are flowcharts illustrating a data writing method according to the third exemplary embodiment of the present invention, wherein FIG. 15A illustrates the steps of setting the global random area 550 and the global random area searching table and FIG. 15B illustrates the steps of writing data.

Referring to FIG. 15A, in step S1501, at least one physical unit is selected from the physical units in the spare area 504 as a first global random area 550-1 and at least one physical unit is selected from the physical units in the spare area 504 as a second global random area 550-2. Here, the first global random area 550-1 temporarily stores data from a plurality of updated logical pages (hereinafter referred to as first updated logical pages) belonging to a plurality of updated logical units(hereinafter referred to as first updated logical units) and the second global random area 500-2 temporarily stores data from a plurality of updated logical pages(hereinafter referred to as second updated logical pages) belonging to a plurality of updated logical units(hereinafter referred to as second updated logical units).

In step S1503, the first global random area searching table and the second global random area searching table are built respectively, wherein the first global random area searching table records the updated information corresponding to the first updated logical pages in the first global random area, and the second global random area searching table records the updated information corresponding to the second updated logical pages in the second global random area. In particular, the information of the logical units which the updated logical pages belong to in the first global random area searching table and the second global random area searching table is recorded by the assigned index numbers.

Referring to FIG. 15B, when the host system 1000 issues a write command to write updated data to a logical pages (hereinafter referred to as a first logical page of a first logical unit). In step S1511, the write command and the updated data corresponding to the write command are received, and in step S1513, whether the first global random area 550-1 stores data belonging to the first logical unit is determined.

If the first global random area 550-1 does not store the data from the first logical unit, in step S1515, whether the second global random area 550-2 stores the data belonging to the first logical unit is determined.

If the second global random area 550-2 does not store the data belonging to the first logical unit, in step S1517, whether the number of the logical units, which the updated data temporarily stored in the first global random area 550-1 belongs to, is smaller than the predetermined number is determined.

If the number of the logical units, which the updated data temporarily stored in the first global random area 550-1 belongs to, is smaller than the predetermined number, in step S1519, an index number which has not been used in the first global random area searching table (hereinafter referred to as a first index number) is assigned to the first logical unit. Thereafter, in step S1521, the updated data is written into the first global random area 550-1 and the updated information corresponding to the first logical page is recorded in the first global random area searching table by using the first index number corresponding to the first logical unit.

If the number of the logical units, which the updated data temporarily stored in the first global random area 550-1 belongs to, is not smaller than the predetermined number, in step S1523, whether the number of the logical units, which the updated data temporarily stored in the second global random area 550-2 belongs to, is smaller than the predetermined number is determined.

If the number of the logical units, which the updated data temporarily stored in the second global random area 550-2 belongs to, is smaller than the predetermined number, in step S1525, an index number which hasn't been used in the second global random area searching table (hereinafter referred to as a second index number) is assigned to the first logical unit. Thereafter, in step S1527, the updated data is written into the second global random area 550-2 and the updated information corresponding to the first logical page is recorded in the second global random area searching table by using the second index number corresponding to the first logical unit.

If the number of the updated logical units, which the updated data temporarily stored in the second global random area 550-2 belongs to, is not smaller than the predetermined number, in step S1529, a physical unit (hereinafter referred to as a first physical unit) is selected from the physical units in the spare area as a child physical unit corresponding to the first logical unit and the updated data is written into the child physical unit corresponding to the first logical unit.

Additionally, in step S1513, it is determined that the first global random area 550-1 stores the data belonging to the first logical unit, step S1521 is performed directly. Furthermore, in step S1515, it is determined that the second global random area 550-2 stores the data belonging to the first logical unit, step S1527 is performed.

It should be noted that, in the third exemplary embodiment, two global random areas are configured. However, the present invention is not limited thereto. The number of the global random areas may be greater than 2.

In summary, the data writing method, the memory controller and the memory storage apparatus according to the exemplary embodiments of the present invention determine whether the number of the logical units, which the updated data temporarily stored in the global random area belongs to, is smaller than the predetermined number before writing the updated data into the global random area, and only when the number of the logical units, which the updated data temporarily stored in the global random area belongs to, is smaller than the predetermined number, the updated data is written into the global random area. Therefore, the global random area searching table only needs to record the updated data from the predetermined number of the logical units and the size of the global random area searching table can be effectively reduced. Accordingly, data is stored by using the global random physical unit in the memory storage apparatus equipped with the buffer memory having small capacity and the speed of writing data in the memory storage apparatus equipped with the buffer memory having small capacity can be effectively improved. Furthermore, according to the data writing method, the memory controller and the memory storage apparatus of another exemplary embodiment of the present invention, the logical units are grouped into the hot logical area and the cold logical area, and only the updated data belonging to the hot logical area is temporarily stored in the global random area, so the global random area which only stores updated data belonging to the limited logical units can be effectively used. Moreover, according to the data writing method, the memory controller and the memory storage apparatus of another exemplary embodiment of the present invention, a plurality of global random area are configured to respectively store updated data of different logical units, so more updated data of the logical units can be temporarily stored in the global random area to improve the speed of writing data in the memory storage apparatus equipped with the buffer memory having small capacity. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A data writing method for a rewritable non-volatile memory module, wherein the rewritable non-volatile memory module includes a plurality of physical blocks, each of the physical blocks includes a plurality of physical pages, the physical blocks are grouped into at least a data area and a spare area, the physical blocks belonging to the data area and the spare area are grouped into a plurality of physical units, the physical units of the spare area are for substituting the physical units of the data area to write data, a plurality of logical units are configured for mapping to the physical units of the data area, and each of the logical units includes a plurality of logical pages, the data writing method comprising:
    selecting at least one physical unit from the physical units of the spare area as a global random area, wherein the global random area temporarily stores data belonging to a plurality of updated logical pages, and the updated logical pages belong to a plurality of updated logical units among the logical units;
    building a global random searching table for recording a plurality of updated information corresponding to the updated logical pages in the global random area;
    receiving a write command and updated data corresponding to the write command, wherein the updated data belongs to a first logical page and the first logical page belongs to a first logical unit among the logical units;
    determining whether the global random area stores data belonging to the first logical unit;
    when the global random area does not store the data belonging to the first logical unit, determining whether the number of the updated logical units is smaller than a predetermined number, wherein the predetermined number is smaller than the total number of the logical units;
    when the number of the updated logical units is smaller than the predetermined number, assigning a first index number for the first logical unit, writing the updated data into the global random area and using the first index number corresponding to the first logical unit to record updated information corresponding to the first logical page in the global random searching table.

2. The data writing method according to claim 1 further comprising:
    when the global random area stores the data belonging to the first logical unit, writing the updated data into the global random area and using the first index number corresponding to the first logical unit to record the updated information corresponding to the first logical page in the global random area searching table.

3. The data writing method according to claim 1 further comprising:
    when the number of the updated logical units is not smaller than the predetermined number, selecting a first physical unit from the physical units of the spare area as a child physical unit corresponding to the first logical unit and writing the updated data into the child physical unit corresponding to the first logical unit, wherein the child physical unit only stores the data belonging to the first logical unit.

4. The data writing method according to claim 1 further comprising:
    recording a writing count corresponding to each of the logical units; and
    grouping the logical units into a hot logical area and a cold logical area according to the writing counts corresponding to the logical units.

5. The data writing method according to claim 4 further comprising:
    before the step of determining whether the global random area stores the data belonging to the first logical unit, further determining whether the first logical unit belongs to the cold logical area; and
    only when the first logical area does not belong to the cold logical area, executing the step of determining whether the global random area stores the data belonging to the first logical unit.

6. The data writing method according to claim 5 further comprising:
    when the first logical unit belongs to the cold logical area, selecting a first physical unit from the physical units of the spare area as a child physical unit corresponding to the first logical unit and writing the updated data into the child physical unit corresponding to the first logical unit.

7. A data writing method for a rewritable non-volatile memory module, wherein the rewritable non-volatile memory module includes a plurality of physical blocks, each of the physical blocks includes a plurality of physical pages and the physical blocks are grouped into at least a data area and a spare area, the physical blocks belonging to the data area and the spare area are grouped into a plurality of physical units, the physical units of the spare area are for substituting the physical units of the data area to write data, a plurality of logical units are configured for mapping to the physical units of the data area, and each of the logical units includes a plurality of logical pages, the data writing method includes:
    selecting at least one physical unit from the physical units of the spare area as a first global random area, and selecting at least one physical unit from the physical units of the spare area as a second global random area, wherein the first global random area temporarily stores data belonging to a plurality of first updated logical pages, the second global random area temporarily stores data belonging to a plurality of second updated logical pages, the first updated logical pages belong to a plurality of first updated logical units, and the second updated logical pages belong to a plurality of second updated logical units;
    building a first global random area searching table for recording a plurality of updated information corresponding to the first updated logical pages in the first global random area, and building a second global random area searching table for recording a plurality of updated information corresponding to the second updated logical pages in the second global random area;

receiving a write command and updated data corresponding to the write command, wherein the updated data belongs to a first logical page and the first logical page belongs to a first logical unit among the logical units;

determining whether the first global random area or the second global random area stores data belonging to the first logical unit;

when both the first global random area and the second global random area do not store the data belonging to the first logical unit, determining whether the number of the first updated logical units is smaller than a predetermined number, wherein the predetermined number is smaller than the total number of the logical units;

when the number of the first updated logical units is smaller than the predetermined number, assigning a first index number for the first logical unit, writing the updated data into the first global random area and using the first index number corresponding to the first logical unit to record updated information corresponding to the first logical page in the first global random area searching table;

when the number of the first updated logical units is not smaller than the predetermined number, determining whether the number of the second updated logical units is smaller than the predetermined number; and when the number of the second updated logical units is smaller than the predetermined number, assigning a second index number for the first logical unit, writing the updated data into the second global random area and using the second index number corresponding to the first logical unit to record the updated information corresponding to the first logical page in the second global random area searching table.

8. A memory controller for controlling a rewritable non-volatile memory module, wherein the rewritable non-volatile memory module includes a plurality of physical blocks, and each of the physical blocks includes a plurality of physical pages, the memory controller comprising:

a host interface, configured to be coupled to a host system;

a memory interface, configured to be coupled to the rewritable non-volatile memory module; and a memory management circuit, coupled to the host interface and the memory interface, and configured to group the physical blocks into at least a data area and a spare area, wherein the memory management circuit groups the physical blocks belonging to the data area and the spare area into a plurality of physical units, wherein the physical blocks of the spare area are for substituting the physical units of the data area to write data, wherein the memory management circuit configures a plurality of logical units for mapping to the physical units of the data area, wherein each of the logical units includes a plurality of logical pages, wherein the memory management circuit selects at least one physical unit from the physical units of the spare area as a global random area, wherein the global random area temporarily stores data belonging to a plurality of updated logical pages, and the updated logical pages belong to a plurality of updated logical units among the logical units, wherein the memory management circuit builds a global random area searching table to record a plurality of updated information corresponding to the updated logical pages in the global random area, wherein the memory management circuit receives a write command and updated data corresponding to the write command, wherein the updated data belongs to a first logical page and the first logical page belongs to a first logical unit among the logical units, wherein the memory management circuit determines whether the global random area stores data belonging to the first logical unit, wherein when the global random area does not store the data belonging to the first logical unit, the memory management circuit determines whether the number of the updated logical units is smaller than a predetermined number, wherein the predetermined number is smaller than the total number of the logical units, wherein when the number of the updated logical units is smaller than the predetermined number, the memory management circuit assigns a first index number for the first logical unit, writes the updated data into the global random area and uses the first index number corresponding to the first logical unit to record updated information corresponding to the first logical page in the global random area searching table.

9. The memory controller as recited in claim 8, wherein when the global random area stores the data belonging to the first logical unit, the memory management circuit writes the updated data into the global random area and uses the first index number corresponding to the first logical unit to record the updated information corresponding to the first logical page in the global random area searching table.

10. The memory controller as recited in claim 8, wherein when the number of the updated logical units is not smaller than the predetermined number, the memory management circuit selects a first physical unit from the physical units of the spare area as a child physical unit corresponding to the first logical unit and writes the updated data into the child physical unit corresponding to the first logical unit, wherein the child physical unit only stores the data belonging to the first logical unit.

11. The memory controller as recited in claim 8, wherein the memory management circuit records a writing count corresponding to each of the logical units and groups the logical units into a hot logical area and a cold logical area according to the writing counts corresponding to the logical units.

12. The memory controller as recited in claim 11, wherein the memory management circuit further determines whether the first logical unit belongs to the cold logical area, and only when the first logical unit does not belong to the cold logical area, the memory management circuit determines whether the global random area stores the data belonging to the first logical unit, wherein when the first logical unit belongs to the cold logical area, the memory management circuit selects a first physical unit from the physical units of the spare area as a child physical unit corresponding to the first logical unit and writes the updated data into the child physical unit corresponding to the first logical unit.

13. A memory storage apparatus, comprising:

a connector, configured to be coupled to a host system;

a rewritable non-volatile memory module, having a plurality of physical blocks, and each of the physical blocks has a plurality of physical pages; and a memory controller, coupled to the connector and the rewritable non-volatile memory module and configured to group the physical blocks into at least a data area and a spare area, wherein the memory controller groups the physical blocks belonging to the data area and the spare area into a plurality of physical units, wherein the physical units of the spare area are for substituting the physical units of the data area to write data, wherein the memory controller configures a plurality of logical units for mapping to the physical units of the data area, wherein each of the logical units includes a plurality of logical pages, wherein the memory controller selects at least one physical unit from the physical units of the spare area as a global random area, wherein the global random area temporarily stores data belonging to a plurality of updated logical pages, and the updated logical pages belong to a plurality of updated logical units among the logical units, wherein the memory controller builds a global random area searching table to record a plurality of updated information corresponding to the updated logical pages in the global random area, wherein the memory controller receives a write command and updated data corresponding to the write command, wherein the updated data belongs to a first logical page and the first logical page belongs to a first logical unit among the logical units, wherein the memory controller determines whether the global random area stores data belonging to the first logical unit, wherein when the global random area does not store the data belonging to the first logical unit, the memory controller determines whether the number of the updated logical units is smaller than a predetermined number, wherein the predetermined number is smaller than the total number of the logical units, wherein when the number of the updated logical units is smaller than the predetermined number, the memory controller assigns a first index number for the first logical unit, writes the updated data into the global random area and uses the first index number corresponding to the first logical unit to record updated information corresponding to the first logical page in the global random area.

14. The memory storage apparatus as recited in claim 13, wherein when the global random area stores the data belonging to the first logical unit, the memory controller writes the updated data into the global random area and uses the first index number corresponding to the first logical unit to record the updated information corresponding to the first logical page in the global random area searching table.

15. The memory storage apparatus as recited in claim 13, wherein when the number of the updated logical units is not smaller than the predetermined number, the memory controller selects a first physical unit from the physical units of the spare area as a child physical unit corresponding to the first logical unit and writes the updated data into the child physical unit corresponding to the first logical unit, wherein the child physical unit only stores the data belonging to the first logical unit.

16. The memory storage apparatus as recited in claim 13, wherein the memory controller records a writing count corresponding to each of the logical units and groups the logical units into a hot logical area and a cold logical area according to the writing counts corresponding to the logical units.

17. The memory storage apparatus as recited in claim 16, wherein the memory controller further determines whether the first logical unit belongs to the cold logical area, and only when the first logical unit does not belong to the cold logical area, the memory controller determines whether the global random area stores the data belonging to the first logical unit.

18. The memory storage apparatus as recited in claim 17, wherein when the first logical unit belongs to the cold logical area, the memory controller selects a first physical unit from the physical units of the spare area as a child physical unit corresponding to the first logical unit and writes the updated data into the child physical unit corresponding to the first logical unit.

19. A data writing method for a rewritable non-volatile memory module, wherein the rewritable non-volatile memory module includes a plurality of physical blocks, each of the physical blocks includes a plurality of physical pages, the physical blocks are grouped into at least a data area and a spare area, the physical blocks belonging to the data area and the spare area are grouped into a plurality of physical units, the physical units of the spare area are for substituting the physical units of the data area to write data, a plurality of logical units are configured for mapping to the physical units of the data area, and each of the logical units includes a plurality of logical pages, the data writing method comprises:

selecting at least one physical unit from the physical units of the spare area as a global random area, wherein the global random area temporarily stores data belonging to a plurality of updated logical pages, and the updated logical pages belong to a plurality of updated logical units among the logical units, receiving a write command and updated data corresponding to the write command, wherein the updated data belongs to a first logical page and the first logical page belongs to a first logical unit among the logical units, determining whether the global random area stores data belonging to the first logical unit;

when the global random area stores the data belonging to the first logical unit, writing the updated data into the global random area;

when the global random area does not store the data belonging to the first logical unit, determining whether the number of the updated logical units is smaller than a predetermined number, wherein the predetermined number is smaller than the total number of the logical units, when the number of the updated logical units is smaller than the predetermined number, writing the updated data into the global random area; and when the number of the updated logical units is not smaller than the predetermined number, selecting a first physical unit from the physical units of the spare area as a child physical unit corresponding to the first logical unit and writing the updated data into the child physical unit corresponding to the first logical unit, wherein the child physical unit only stores the data corresponding to the first logical unit.

20. A memory storage apparatus, comprising:
a connector, configured to be coupled to a host system;
a rewritable non-volatile memory module, having a plurality of physical blocks, and each of the physical blocks includes a plurality of physical pages; and
a memory controller, coupled to the connector and the rewritable non-volatile memory module and configured to group the physical blocks into at least a data area and a spare area,
wherein the memory controller groups the physical blocks belonging to the data area and the spare area into a plurality of physical units, wherein the physical units of the spare area are for substituting the physical units of the data area to write data, wherein the memory controller configures a plurality of logical units for mapping to the physical units of the data area, wherein each of the logical units includes a plurality of logical pages, wherein the memory controller selects at least one physical unit from the physical units of the spare area as a global random area, wherein the global random area temporarily stores data belonging to a plurality of updated logical pages, and the updated logical pages belong to a plurality of updated logical units among the logical units, wherein the memory controller receives a write command and updated data corresponding to the write command, wherein the updated data belongs to a first logical page and the first logical page belongs to a first logical unit among the logical units, wherein the memory controller determines whether the global random area stores data belonging to the first logical unit, wherein when the global random area does not store the data belonging to the first logical unit, the memory controller determines whether the number of the updated logical units is smaller than a predetermined number, wherein the predetermined number is smaller than the total number of the logical units, wherein when the number of the updated logical units is smaller than the predetermined number, the memory controller writes the updated data into the global random area, wherein when the global random area stores the data belonging to the first logical unit, the memory controller writes the updated data into the global random area, wherein when the number of the updated logical units is not smaller than the predetermined number, the memory controller selects a first physical unit from the physical units of the spare area as a child physical unit corresponding to the first logical unit and writes the updated data into the child physical unit corresponding to the first logical unit, wherein the child physical unit only stores the data belonging to the first logical unit.

\* \* \* \* \*